US012661849B2

(12) United States Patent
Zhan

(10) Patent No.: US 12,661,849 B2
(45) Date of Patent: Jun. 23, 2026

(54) LEVELING APPARATUS AND 3D PRINTER

(71) Applicant: Shenzhen Anycubic Technology Co., Ltd., Shenzhen (CN)

(72) Inventor: Xiaolin Zhan, Shenzhen (CN)

(73) Assignee: SHENZHEN ANYCUBIC TECHNOLOGY CO., LTD., Shenzhen (CN)

( * ) Notice: Subject to any disclaimer, the term of this patent is extended or adjusted under 35 U.S.C. 154(b) by 436 days.

(21) Appl. No.: 18/201,859

(22) Filed: May 25, 2023

(65) Prior Publication Data

US 2024/0001611 A1    Jan. 4, 2024

(30) Foreign Application Priority Data

Jul. 4, 2022    (CN) .......................... 202210776916.0
Aug. 25, 2022    (CN) .......................... 202222257682.7

(51) Int. Cl.
| | |
|---|---|
| *B29C 64/124* | (2017.01) |
| *B29C 64/232* | (2017.01) |
| *B29C 64/245* | (2017.01) |
| *B29C 64/393* | (2017.01) |
| *B33Y 30/00* | (2015.01) |

(52) U.S. Cl.
CPC .......... *B29C 64/245* (2017.08); *B29C 64/232* (2017.08); *B33Y 30/00* (2014.12)

(58) Field of Classification Search
CPC ... B29C 64/245; B29C 64/232; B29C 64/135; B29C 64/124; B29C 64/393; B33Y 30/00; B33Y 50/02
See application file for complete search history.

(56) References Cited

U.S. PATENT DOCUMENTS

| | | | |
|---|---|---|---|
| 2021/0172734 A1* | 6/2021 | Cao ........................ | B29C 64/386 |
| 2022/0193996 A1* | 6/2022 | Durand ................. | B29C 64/393 |
| 2022/0396033 A1* | 12/2022 | Liu ......................... | B22F 10/85 |

FOREIGN PATENT DOCUMENTS

CN          113665102 A      11/2021

* cited by examiner

*Primary Examiner* — Galen H Hauth
*Assistant Examiner* — Baileigh Kate Darnell
(74) *Attorney, Agent, or Firm* — Bayramoglu Law Offices LLC

(57) ABSTRACT

A leveling apparatus for leveling a 3D printer includes a leveling module. The leveling module is used to push or pull back a target component in a first direction under the control of an electrical signal. The leveling module includes a driving assembly and a transmission assembly. A first end of the transmission assembly is connected to the driving assembly, and a second end of the transmission assembly is configured to be directly or indirectly connected to the target component. The driving assembly is connected to the transmission assembly to drive the transmission assembly to move, so as to push and/or pull back the target component in the first direction.

16 Claims, 12 Drawing Sheets

300

600

100

200

300

600

100

531

445

4451

4452

4453

300

210

220

200

210

5311

532

531

533

5312

510

521

520

522

551

550

552

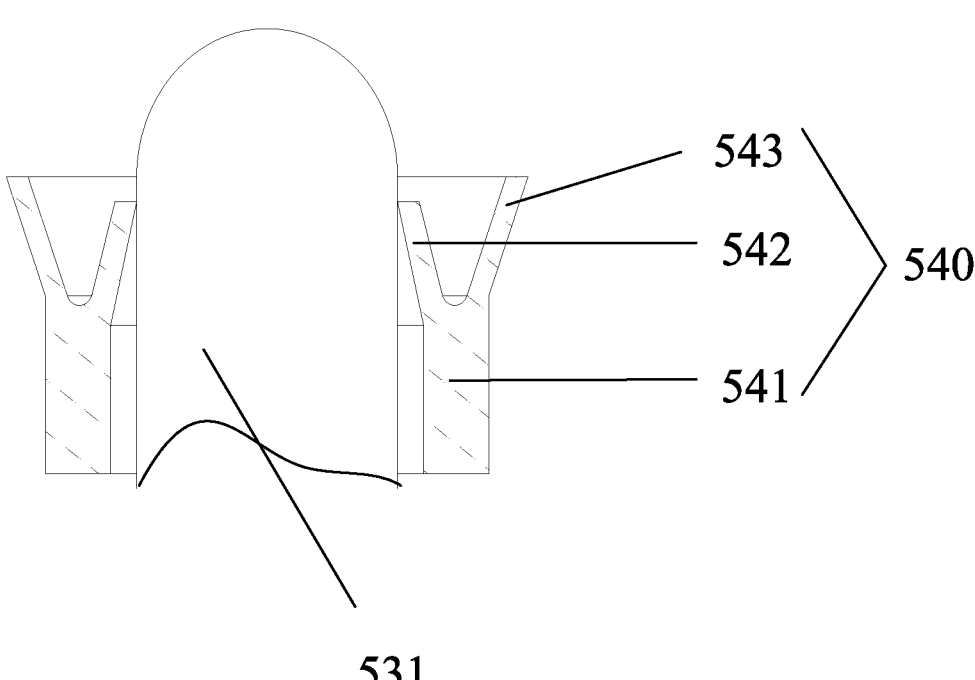
543
542      540
541
531
FIG. 17
560
451
450
FIG. 18
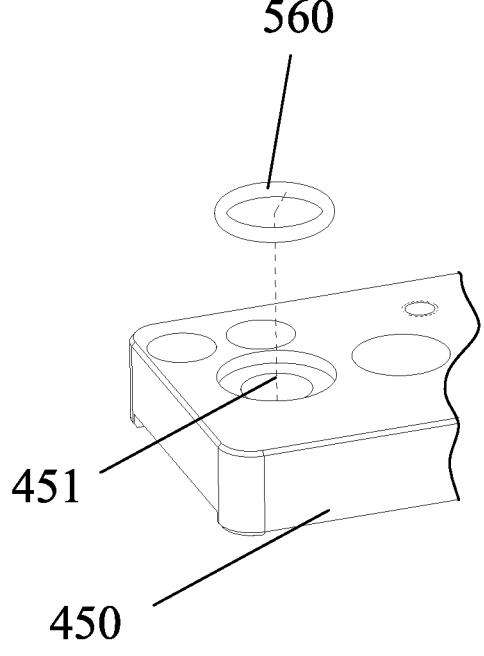

LEVELING APPARATUS AND 3D PRINTER

CROSS REFERENCE TO THE RELATED APPLICATIONS

This application is based upon and claims priority to Chinese Patent Applications No. 202222257682.7, filed on Aug. 25, 2022, and No. 202210776916.0, filed on Jul. 4, 2022, the entire contents of which are incorporated herein by reference.

TECHNICAL FIELD

The present disclosure relates to the technical field of 3D printing, and in particular, to a leveling apparatus, a supporting assembly, a 3D printer, and a measurement module.

BACKGROUND

In a photocuring 3D printer, taking advantage of the characteristic of photosensitive resin in a fluid state being subject to a polymerization reaction in the presence of light, a light source irradiates according to the shape of a cross section of an object to be formed to cause the resin in the fluid state to be cured and formed. In the technology of light bottom-projection, a light-transmitting screen is arranged on a top plate of a base of a printer, a resin vat filled with resin is placed on the light-transmitting screen, a release liner is attached to the light-transmitting screen, a printing platform is immersed in the resin, a uniform gap is kept between the printing platform and the release liner at the bottom of the resin vat, and light from the light source is projected on the resin on a side of the release liner through the light-transmitting screen, so that the resin between the printing platform and the release liner is cured.

Formation of a first layer of a printed product is very important. Because the release liner is supported by the light-transmitting screen, an inclination and flatness of the release liner are determined by the light-transmitting screen. Therefore, it should be ensured that there is a uniform gap between the light-transmitting screen and a forming surface of the printing platform, so that the forming surface of the printing platform is parallel to the release liner, and there is a precise distance therebetween to ensure the precision of the printed product. Replacement of the printing platform or a mechanical error easily changes longitudinal positions of the printing platform and the light-transmitting screen. For example, if the forming surface of the printing platform is not parallel to the light-transmitting screen or the distance therebetween changes, the first layer of the model cannot be bonded to the printing platform, or a bonding strength of the first layer of the model on the printing platform is not uniform, so that stability of the model during printing is not good, and tilt of the model causes printing distortion.

In existing leveling, it is ensured that the forming surface of the printing platform is parallel to the light-transmitting screen mainly by manually leveling the printing platform. For example, the patent publication No. CN 113665102 A discloses a 3D printer structure, including a body, and a printing screen and a mounting frame which are arranged on the body. A universal rod is connected to a printing platform, and the mounting frame is provided with a mounting sleeve; the universal rod is coaxially and fixedly connected to a universal ball, the universal ball is embedded into a through slot provided in the mounting sleeve, so that the printing platform is rotatably arranged on the mounting frame, the printing platform abuts against the printing screen during its downward movement, and thus the printing platform adaptively rotates to be parallel to the printing screen and is fixed by a first screw. Leveling by adjusting the printing platform leads to unstable connection between the printing platform and the mounting frame, and the printing platform easily gets loosened during printing. In addition, the printing platform needs to be fixed by manually screwing a bolt, and the printing platform is prone to movement during screwing of the bolt.

SUMMARY

In view of this, embodiments of the present disclosure provide a leveling apparatus, a supporting assembly, a 3D printer, and a measurement module, a reduction in a fixation strength of the printing platform caused by the adjustment of the printing platform is prevented mainly by means the provision of the leveling apparatus through the adjustment of the inclination or height of the target component, and a manual operation error is avoided through the adjustment of a target component by the leveling apparatus.

A leveling apparatus for leveling a 3D printer, includes a leveling module. Where the leveling module is at least configured to push and/or pull back a target component in a first direction under the control of an electrical signal; the leveling module includes a driving assembly and a transmission assembly, where one end of the transmission assembly is connected to the driving assembly, and the other end thereof is configured to be directly or indirectly connected to the target component; the driving assembly is connected to the transmission assembly to drive the transmission assembly to move, so as to push and/or pull back the target component in the first direction.

A supporting assembly, includes at least two leveling apparatuses according to any one of the foregoing embodiments, and a target component, where a transmission assembly is directly or indirectly connected to the target component; and the leveling apparatuses are configured to adjust the inclination or height of the target component.

A 3D printer, includes the supporting assembly according to any one of the foregoing embodiments, a base, and a light source assembly, where the supporting assembly is connected to the base, the light source assembly is arranged in the base, and light emitted by the light source assembly is projected on a light-transmitting region of the target component.

A measurement module for leveling a 3D printer and includes a displacement sensor, where the displacement sensor includes a sensor body and a probe passing through the sensor body, where two ends of the probe are exposed from the sensor body; and one end of the probe is used to be in contact with a target leveling component, and the other end thereof is provided with a limiting member.

A measurement module for leveling a 3D printer and including a support seat assembly, a displacement sensor and a measurement rod assembly, where the displacement sensor is connected to the support seat assembly, the measurement rod assembly is movably connected to the support seat assembly, a first end of the measurement rod assembly is opposite to a probe of the displacement sensor, and a second end of the measurement rod assembly is configured for contact with a target leveling component; and the measurement rod assembly is configured to push the probe of the displacement sensor to generate measurement information.

In the leveling apparatus, the supporting assembly, the 3D printer, and the measurement module provided by the embodiments of the present disclosure, a reduction in a fixation strength of the printing platform caused by the adjustment of the printing platform is prevented mainly by means the provision of the leveling apparatus through the adjustment of the inclination or height of the support, and a manual operation error is avoided through the adjustment of a target component by the leveling apparatus. In the prior art, leveling by adjusting the printing platform leads to unstable connection between the printing platform and the mounting frame, and the printing platform easily get loosened during printing. In addition, the printing platform needs to be fixed by manually screwing a bolt, and the printing platform is prone to movement during screwing of the bolt. Compared with the prior art, in the document of the present application, the target component is configured for placing a resin vat, and the leveling apparatuses are fixed to the base, so that at least two leveling apparatuses are provided between the target component and the base; and the inclination or height of the support is adjusted by the leveling apparatuses in such a way that a uniform gap is provided between the release liner of the resin vat and the printing platform, thereby ensuring precise printing of a first layer of a printed model.

BRIEF DESCRIPTION OF THE DRAWINGS

FIG. 17 is a schematic structural diagram of a seal according to an embodiment of the present disclosure; and FIG. 18 is a schematic structural diagram of a seal ring and a connecting assembly according to an embodiment of the present disclosure.

DETAILED DESCRIPTION OF THE EMBODIMENTS

Figure 1:
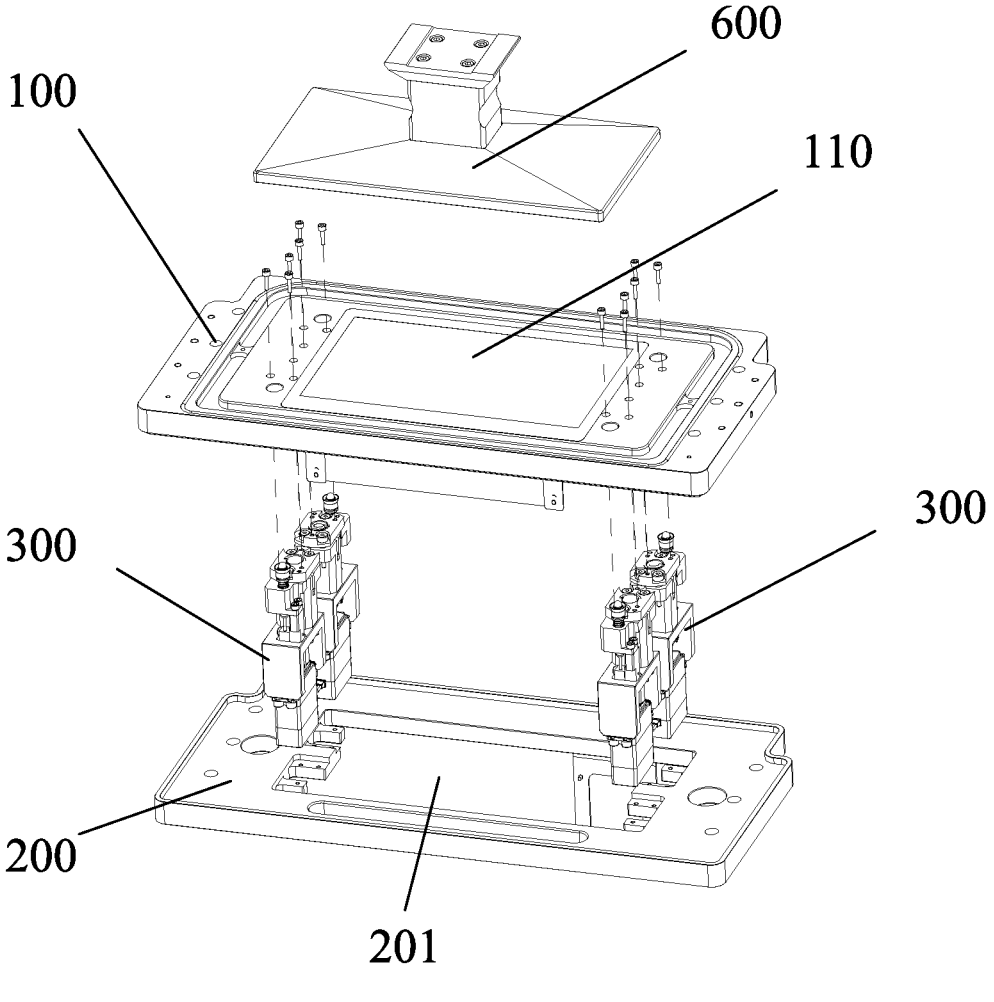
FIG. 1 is a schematic exploded view of a composition structure of a supporting assembly according to an embodiment of the present disclosure.
Figure 2:
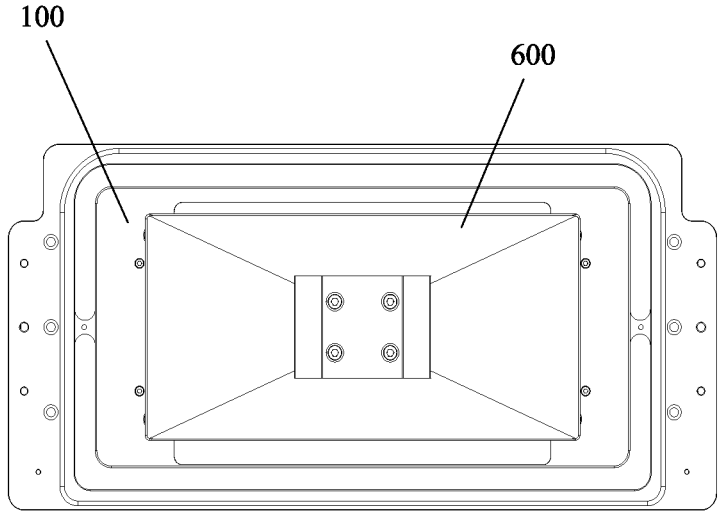
FIG. 2 is a schematic structural diagram of the supporting assembly according to an embodiment of the present disclosure from a first perspective.
Figures 3, 4:
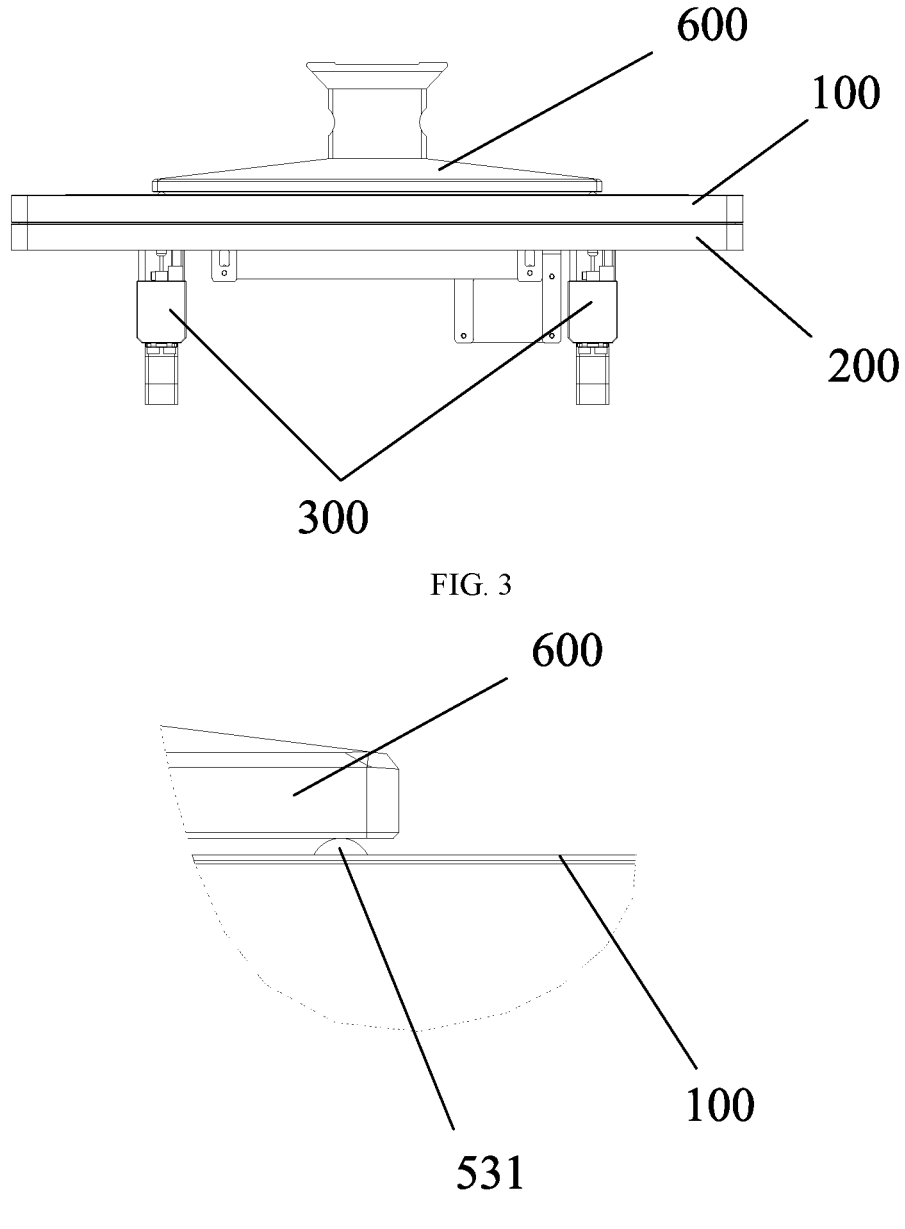
FIG. 3 is a schematic structural diagram of the supporting assembly according to an embodiment of the present disclosure from a second perspective.
FIG. 4 is a partially enlarged schematic structural diagram of the supporting assembly according to an embodiment of the present disclosure.
Figure 5:
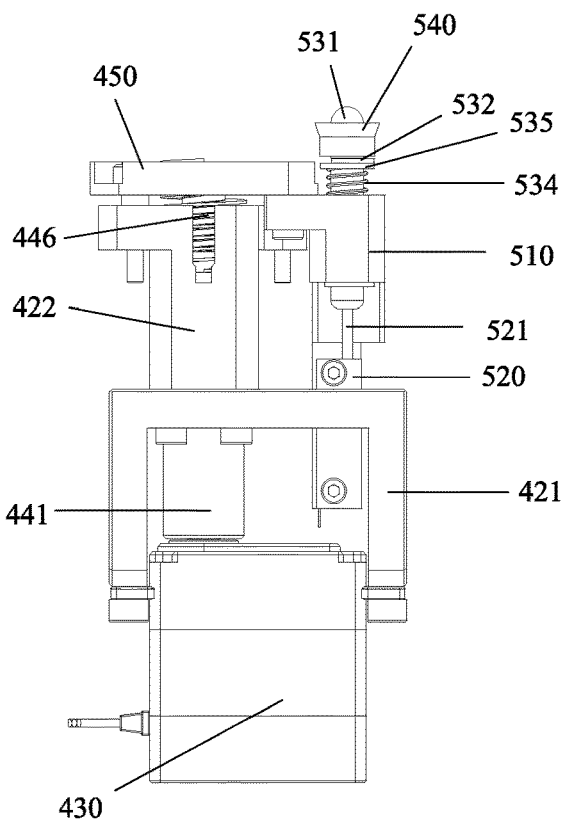
FIG. 5 is a schematic diagram of an overall structure of a leveling apparatus according to an embodiment of the present disclosure.
Figure 6:
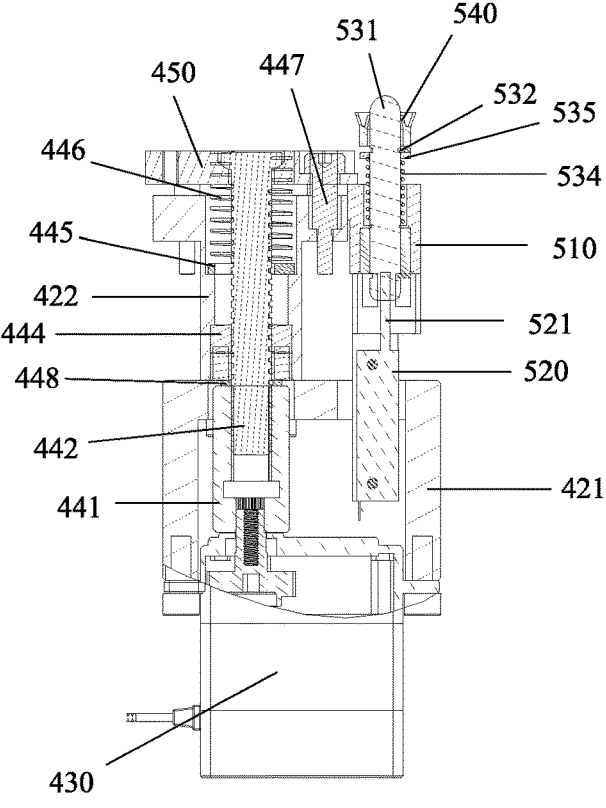
FIG. 6 is a schematic cross-sectional structural diagram of the leveling apparatus according to an embodiment of the present disclosure.

In order to further set forth the technical means and effects provided by the present disclosure to achieve the intended purpose of the present disclosure, a leveling apparatus, a supporting assembly, a 3D printer, and a measurement module proposed according to the present disclosure, and their specific embodiments, structures, features and effects are described in detail below with respect to the accompanying drawings and preferred embodiments.

In an embodiment, as shown in FIGS. 5-8, an embodiment of the present disclosure provides a leveling apparatus 300 for leveling a 3D printer. The leveling apparatus 300 includes a leveling module 400, where the leveling module 400 is at least configured to push and/or pull back a target component in a first direction under the control of an electrical signal; the leveling module 400 includes a driving assembly 430 and a transmission assembly 440, where one end of the transmission assembly 440 is connected to the driving assembly 430, and the other end thereof is configured to be directly or indirectly connected to the target component; and the driving assembly 430 is connected to the transmission assembly 440 to drive the transmission assembly 440 to move, so as to push and/or pull back the target component in the first direction.

There may be various target components, and the leveling apparatus 300 can implement the leveling of the various target components. An example in which a support 100 for supporting a resin vat is the target component is described below. The first direction may be a vertical direction, or another direction (for example, a horizontal direction, which is converted into some components in the vertical direction by a beveled contact transmission structure). The transmission assembly 440 being directly or indirectly connected to the target component means that the transmission assembly 440 can be directly connected to the support 100, or the transmission assembly 440 is connected to the support 100 by a connecting assembly 450 in the following embodiments; and as for the connection herein, it can be understood that contact is also a connection. The leveling module 400 being controlled by the electrical signal means that the driving assembly 430 in the leveling module 400 is controlled by the electrical signal to drive the transmission assembly 440 to move and to drive the target component to move. For example, the driving assembly 430 includes an electric motor, and the number of revolutions of the motor is controlled by the electrical signal. The structures of several specific embodiments of the leveling apparatus 300 will be described below with respect to an embodiment of a supporting assembly of the present disclosure.

In an embodiment, as shown in FIGS. 1-7, an embodiment of the present disclosure further provides a supporting assembly for a 3D printer. The 3D printer includes a base and printing platform 600, where the supporting assembly includes a support 100 and at least two leveling apparatuses 300, where transmission assemblies 440 of the leveling apparatuses 300 are directly or indirectly connected to the support 100; and the leveling apparatuses 300 are configured to adjust the inclination or height of the support 100.

According to different light projection directions of a light source assembly, the 3D printer includes an light top-projection type and a light bottom-projection type. For ease of description, a light bottom-projection type 3D printer is taken as an example for detailed description of the structure, that is, light is projected to the support 100 from bottom to top, and this is subject to an actual orientation of the 3D printer in use. In an embodiment, the 3D printer includes a base (not shown) and a light source assembly (not shown). The base has a top opening, and the supporting assembly is arranged at the top opening for supporting a resin vat and transmit light to cause the printing resin in the resin vat to be cured and formed on the printing platform 600. The leveling apparatus 300 can be directly connected to the base, and for example, the leveling apparatus 300 is connected to an edge of the top opening of the base, or in an embodiment, to facilitate mounting of the supporting assembly, the supporting assembly further includes a base frame 200. The base frame 200 is arranged at the top opening of the base. The base frame 200 has a frame structure with a middle light-transmitting opening 201, and the support 100 and the base frame 200 are stacked. The support 100 is provided with a light-transmitting screen, a light-transmitting region 110 is located on the light-transmitting screen, and the middle light-transmitting opening 201 corresponds to the light-transmitting screen. The base has a cavity structure, and a light source assembly is arranged in the base. Light emitted by the light source assembly passes through the middle light-transmitting opening 201 of the base frame 200 and is projected to the light-transmitting screen, and then passes through the light-transmitting screen and is projected onto the resin to cure the resin. A non-display region is provided outside the light-transmitting screen on the support 100, and leveling apparatuses 300 are arranged between the non-display region and the base frame 200. At least two leveling apparatuses 300 are provided, and the leveling apparatuses 300 are arranged on different sides outside the light-transmitting screen. For example, in one embodiment, the light-transmitting screen is approximately square. When two leveling apparatuses 300 are provided, the two leveling apparatuses 300 are arranged on two sides of the square, and the two leveling apparatuses 300 simultaneously adjust an orientation of the same plane. When three leveling apparatuses 300 are provided, the three leveling apparatuses 300 are respectively arranged on outer sides of different corners of the light-transmitting screen. Alternatively, in another embodiment, when four leveling apparatuses 300 are provided, the four leveling apparatuses 300 are respectively arranged on outer sides of four corners of the light-transmitting screen, and the specific arrangement can be adjusted according to an actual structure, such that the leveling apparatuses 300 can adjust the inclination or height of the support 100 at different positions, thus implementing the adjustment of the inclination or height of a plane where the support 100 is located.

In some embodiments, the foregoing light-transmitting screen can be a light-transmitting transparent sheet, such as tempered glass, light is projected by a light machine similar to a projector as a light source assembly to the light-transmitting screen, and then passes through the light-transmitting screen and is projected onto the resin, to cure the resin. In some other embodiments, the light-transmitting screen can also be a display screen, such as a liquid crystal display (LCD), and creates different light-transmitting patterns through selective light transmission, and the light from a light source passes through the different light-transmitting patterns, and then passes through the light-transmitting screen and is projected onto the resin to cure the resin.

In the leveling apparatus, the supporting assembly, the 3D printer, and the measurement module provided according to the embodiments of the present disclosure, a reduction in a fixation strength of the printing platform caused by the adjustment of the printing platform is prevented mainly by means the provision of the leveling apparatus through the adjustment of the inclination or height of the support, and a manual operation error is avoided through the adjustment of the support by the leveling apparatus. In the prior art, leveling by adjusting the printing platform leads to unstable connection between the printing platform and the mounting frame, and the printing platform easily get loosened during printing. In addition, the printing platform needs to be fixed by manually screwing a bolt, and the printing platform is prone to movement during screwing of the bolt. Compared with the prior art, in the present application document, the support is configured to place a resin vat, and the leveling apparatuses are fixed to the base, so that at least two leveling apparatuses are provided between the support and the base; and the inclination or height of the support is adjusted by the leveling apparatuses in such a way that a uniform gap is provided between the release liner of the resin vat and the printing platform, thereby ensuring precise printing of a first layer of a printed model.

In an embodiment, the driving assembly 430 acts as a steering engine, the transmission assembly 440 includes a nut 441 and a lead screw 442, a power output shaft of the steering engine is connected to one end of the nut 441 to drive the nut 441, the other end of the nut 441 is in threaded connection with one end of the lead screw 442, and the other end of the lead screw 442 is configured to be connected to the target component to push and/or pull back the target component in the first direction. The steering engine drives the nut 441 to rotate, and threaded pushing actions of the nut 441 and the lead screw 442 cause the lead screw 442 to move up and down, thereby driving the target component connected thereto to move. Alternatively, in another embodiment, the driving assembly 430 is an electric motor, and the transmission assembly 440 is the lead screw 442. A power output shaft of the electric motor is in transmission connection with one end of the lead screw 442, and the other end 442 of the lead screw is configured to be in threaded connection with the target component. The electric motor is directly connected to the lead screw 442 and drives the lead screw 442 to rotate, the lead screw 442 rotates relative to the target component, and an threaded pushing action between the lead screw 442 and the target component causes the target component to move up and down.

In an embodiment of the present disclosure, the leveling apparatus 300 includes an electric motor, a lead screw 442 and a fixing frame 421, and an output shaft of the electric motor is coupled to a lower end of the lead screw 442, or the output shaft of the electric motor and the lead screw 442 are manufactured integrally. The electric motor is fixed to the fixing frame 421, and the fixing frame 421 is fixed to a device. An upper end of the lead screw 442 is in direct threaded connection with the support 100. In this embodiment, the electric motor drives the lead screw 442 to rotate. Because the lead screw 442 is in direct threaded connection with the support 100, and the movement of the support 100 in a circumferential direction is restricted, the rotation of the lead screw 442 is converted into an axial movement of the support 100, thereby implementing the adjustment. Alternatively, the leveling apparatus further includes a connecting assembly 450, wherein an upper end of the lead screw 442 is in threaded connection with the connecting assembly 450 rather than being in direct contact with the support 100, and an upper surface of the connecting assembly 450 is in contact with the support 100. When the circumferential rotation of the connecting assembly 450 is limited, the rotation of the lead screw 442 is converted into an axial movement of the connecting assembly 450, thereby pushing the support 100 to move for adjustment.

In an embodiment, the leveling apparatus 300 further includes a measurement module 500 for measuring position information of a target leveling component in the first direction, where relative positions of the measurement module 500 and the leveling module 400 are fixed. As for fixed relatives positions, in one case, the measurement module 500 and the leveling module 400 can be fixed together, or can be fixed separately, but the relative positions are not changed any more during an automatic leveling. (relative fixing herein does not exclude the movements of respective moving components in the two modules.)

The leveling apparatus 300 includes a leveling module 400 and a measurement module 500. The measurement module 500 protrudes from an upper surface of the support 100, and there can be various target leveling components. In the present application, as an example, a printing platform 600 is a target leveling component. The relative positions of the measurement module 500 and the leveling module 400 are fixed, that is, the measurement module 500 acts synchronously with the leveling module 400, or the measurement module 500 acts synchronously with the support 100. In an embodiment in which the leveling module 400 includes a connecting assembly 450 and the leveling module 400 is connected to the target component by the connecting assembly 450, the measurement module 500 can be connected to the connecting assembly 450 to synchronize the actions of the measurement module 500 and the support 100, or the measurement module 500 can be directly connected to the support 100, for example, connected to the support 100 by a support seat assembly 510. The specific structure of the measurement module 500 is taken as an example below for detailed description.

In an embodiment, the support 100 includes a light-transmitting region 110, leveling modules 400 are connected to the support 100, and the leveling modules 400 of the at least two leveling apparatuses 300 are located on different sides of the light-transmitting region 110.

The support 100 includes a measurement opening, the measurement modules 500 pass through the support 100 through the measurement opening, and the measurement modules 500 are opposite to a forming surface of the printing platform 600. For example, four leveling apparatuses 300 are provided, and the measurement modules 500 of the leveling apparatuses 300 are opposite to portions of the forming surface of the printing platform 600 close to four corners. The leveling modules 400 are respectively connected to the base frame 200 and an outer side of the light-transmitting region 110 of the support 100. The leveling modules 400 are configured to change the height of the support 100. The plurality of leveling modules 400 are connected to the support 100 at different positions, so that the height of the support 100 is adjusted at different positions, thereby adjusting an angle of inclination of the support 100 so that the support 100 or the light-transmitting screen is parallel to the forming surface of the printing platform 600. The leveling in the present application mainly means that the inclination or height between a plurality of components is adjusted to make planes where the components are located parallel to each other as far as possible.

The measurement module 500 is configured to generate measurement information, and the measurement information can be height information of the printing platform 600, or can be only touch information. The measurement information can be obtained through the touch between printing platform 600 and the measurement module 500, or can be obtained through non-contact measurement by the measurement module 500. For example, in an embodiment of non-contact measurement, the printing platform 600 may not move, and the measurement module 500 measures the height of the forming surface of the printing platform 600 by means of infrared ranging to generate the measurement information, such as the height information of the printing platform 600. For example, in an embodiment of contact measurement, the printing platform 600 moves downward, and the forming surface of the printing platform 600 touches the measurement module 500, so that the measurement module 500 generates the measurement information, such as the height information of the printing platform 600. When the printing platform 600 is not horizontal, or the printing platform 600 is not parallel to the support 100, the measurement modules 500 at different positions generate different measurement information, and then the height of the support 100 is adjusted by the leveling modules 400 according to the measurement information. If the printing platform 600 is inclined, a first side of the printing platform 600 is lower while a second side thereof is higher, the leveling modules 400 raise a side of the support 100 corresponding to the second side of the printing platform 600, so that the support 100 is inclined to be consistent with the inclination of the printing platform 600. The measurement information can be a voltage signal. For example, the measurement module 500 includes a proximity sensor, and the measurement information is an analog voltage output from the proximity sensor. The specific structures and principles of the leveling modules 400 and the measurement module 500 can be various, and will be described in detail below.

In an embodiment, as shown in FIGS. 5-8, the leveling module 400 further includes a fixing assembly 420 and a connecting assembly 450. The driving assembly 430 is connected to the fixing assembly 420 and the transmission assembly 440, the transmission assembly 440 is connected to the connecting assembly 450, and the connecting assembly 450 is connected to the support 100. The driving assembly 430 is configured to drive, by means of the transmission assembly 440, the connecting assembly 450 to move relative to the fixing assembly 420, so as to drive the support 100 to move and be leveled.

In an embodiment, the middle light-transmitting opening 201 of the base frame 200 has an area greater than that of the light-transmitting screen, and the leveling apparatuses 300 are located in the middle light-transmitting opening 201 and is fixed to an edge of the middle transparent opening 201, so that the leveling apparatuses 300 can be partially located in the base to shorten a spacing between the support 100 and the base frame 200 and ensure the stability of the support 100. In addition, the leveling apparatuses 300 are connected to the base frame 200, modular installation of the leveling apparatuses 300 can be implemented, and positions of the leveling apparatuses 300 are fixed by the base frame 200. This avoids position deviation of the leveling apparatuses 300 during installation, makes the heights of the leveling apparatuses 300 before leveling uniform, and reduces the influence of an installation error on leveling, so that the leveling process is smoother and more stable. The 3D printer further includes a main controller, where the main controller is connected to the measurement module 500 and receives the measurement information generated by the measurement module 500. The main controller is further connected to the driving assembly 430 and controls, according to the measurement information, the driving assembly 430 to operate. For example, the driving assembly 430 can be a steering engine. The steering engine includes a housing, and a steering engine control circuit board, a DC motor, an angle sensor and a gear assembly that are arranged inside the housing. The steering engine further includes an output shaft. The DC motor is connected to the output shaft by the gear assembly, the steering engine control circuit board is connected to the DC motor, the angle sensor is connected to the output shaft and the steering engine control circuit board, and an end of the output shaft is located outside the housing and is connected to the nut 441. The DC motor transmits power to the output shaft by means of transmission and speed change of the gear assembly. In addition, the angle sensor and the steering engine control board are configured to cooperate in controlling a rotation angle of the output shaft. The steering engine control circuit board is connected to the main controller, and controls the rotation angle of the output shaft according to the measurement information. The transmission assembly 440 is configured to convert the number of revolutions of the electric motor into longitudinal displacement, which in turn forces the support 100 to move. The connecting assembly 450 can specifically have a plate-like structure, and is connected to the support 100 by a bolt. The specific connection structure will be described in detail below.

In an embodiment, the transmission assembly 440 includes a nut 441 and a lead screw 442. The driving assembly 430 is connected to the fixing assembly 420, the nut 441 is connected to the driving assembly 430, a first end of the lead screw 442 is in threaded connection with the nut 441, and a second end of the lead screw 442 is connected to the connecting assembly 450. The nut 441 is configured to rotate under an action of the driving assembly 430, and the rotation of the lead screw 442 is converted, by means of a threaded pushing action of the nut 441, into a vertical movement, that is, the lead screw 442 can move up and down relative to the fixing assembly 420.

In an embodiment, the nut 441 is a trapezoidal nut, and the lead screw 442 is a trapezoidal lead screw that matches the nut 441, so that both transmission and self-locking can be implemented between the nut 441 and the lead screw 442. A friction force between the nut 441 and the lead screw 442 is converted into an expansion force between the nut 441 and the lead screw 442, which prevents the nut 441 and the lead screw 442 from loosening and achieves a shockproof effect.

In an embodiment, the fixing assembly 420 includes a fixing frame 421 and a limiting sleeve 422 connected to the fixing frame 421, where the driving assembly 430 is connected to the fixing frame 421, the lead screw 442 passes through the limiting sleeve 422, and the limiting sleeve 422 functions to guide and limit the lead screw 442.

Figure 7:
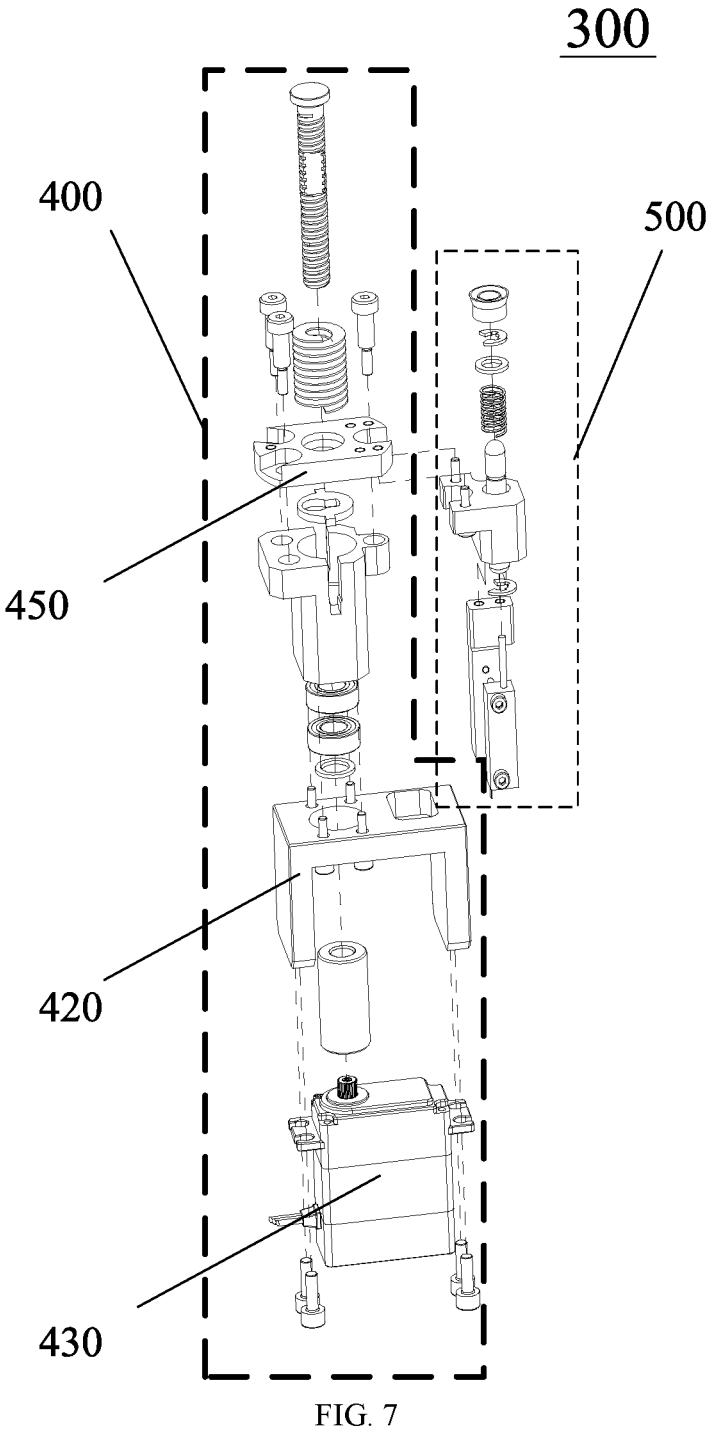
FIG. 7 is a schematic exploded view of a composition structure of the leveling apparatus according to an embodiment of the present disclosure.
Figure 8:
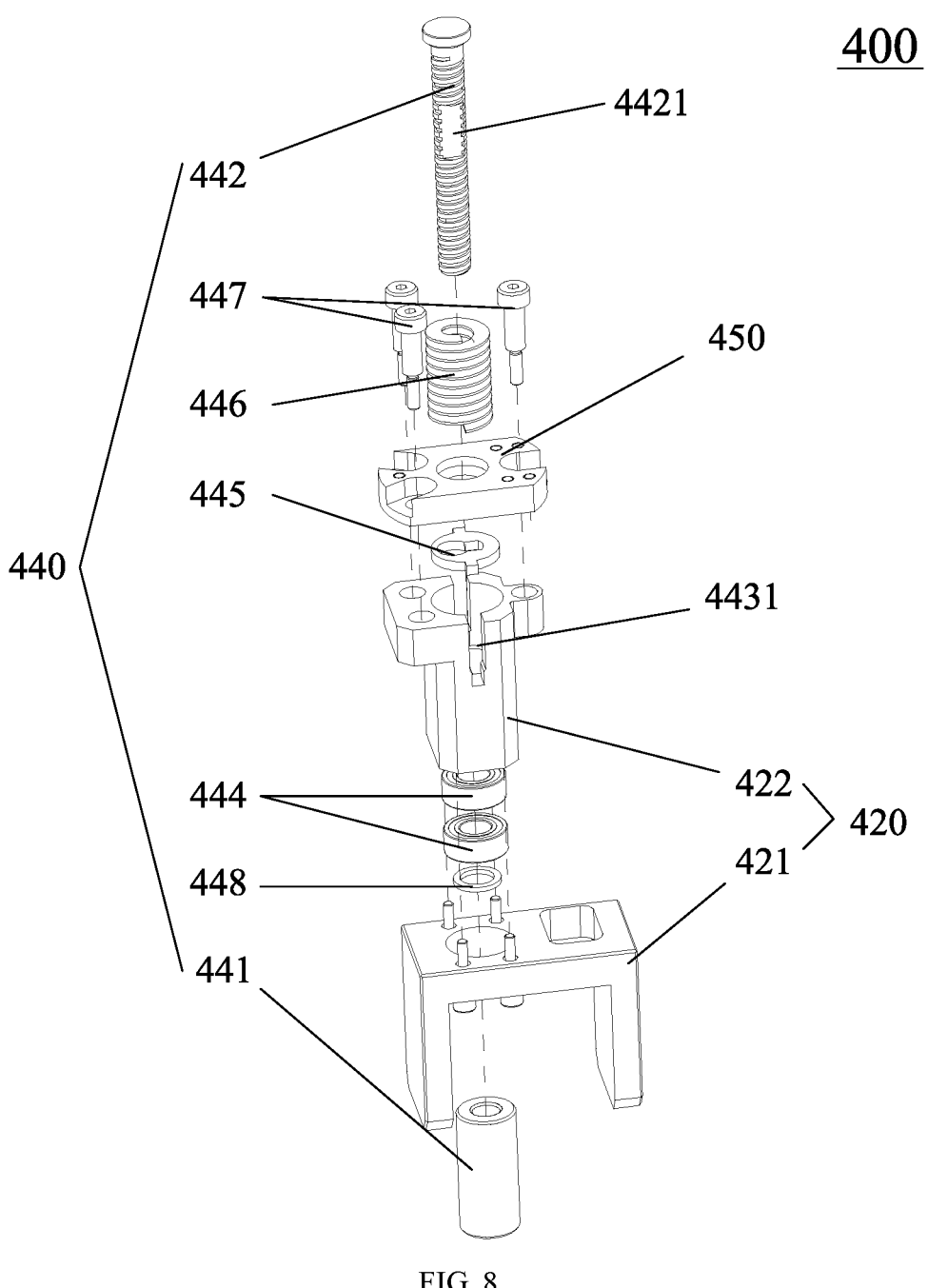
FIG. 8 is a schematic exploded view of the composition structure of the leveling module according to an embodiment of the present disclosure.
Figure 9:
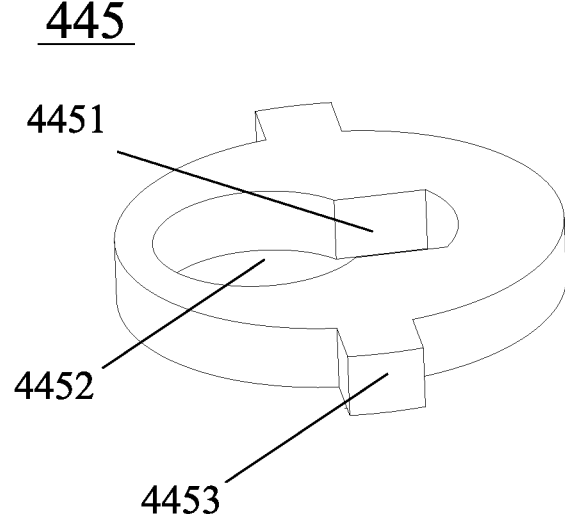
FIG. 9 is a schematic structural diagram of a stop washer according to an embodiment of the present disclosure.
Figure 10:
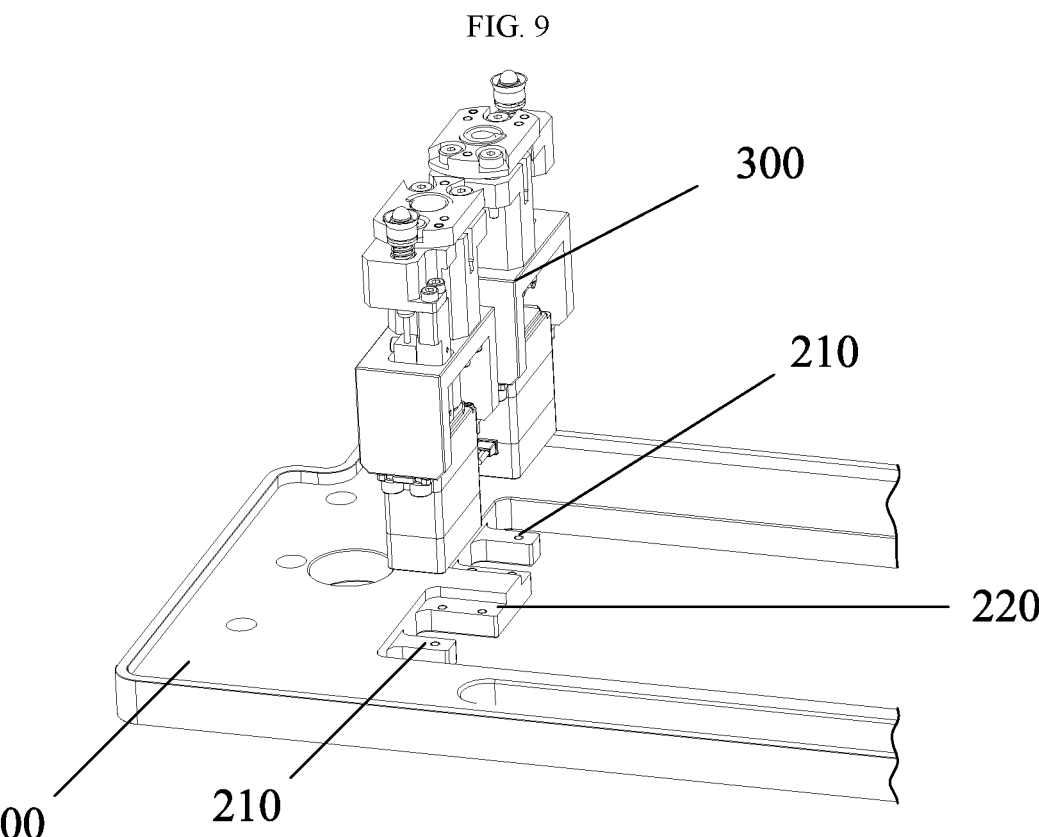
FIG. 10 is a schematic structural diagram of a base frame according to an embodiment of the present disclosure.

In an embodiment, as shown in FIGS. 7-9, the transmission assembly 440 further includes a stop washer 445, where the stop washer 445 includes a limiting opening 4451, the lead screw 442 is provided with a limiting recess 4421, the stop washer 445 is connected to the limiting sleeve 422, the lead screw 442 passes through the limiting opening 4451, and the limiting opening 4451 abuts against the limit recess 4421 to circumferentially limit the lead screw 442, which prevents the lead screw 442 from being driven by the nut

441 to rotate, so that the lead screw 442 only moves up and down and can not circumferentially rotate.

As shown in FIG. 9, the stop washer 445 further includes a mounting hole 4452. The mounting hole 4452 communicates with the limiting opening 4451. The mounting hole 4452 is fitted to a portion of the lead screw 442 having a maximum diameter, so that the lead screw 442 can freely pass through the mounting hole 4452, and the limiting opening 4451 is adapted to the shape of the limit recess 4421. During installation, the lead screw 442 passes through the mounting hole 4452 and axially moves until the limit recess 4421 enters the mounting hole 4452, and the lead screw 442 is forced into the limiting opening 4451. An outer wall of the limit recess 4421 abuts against an edge of the limiting opening 4451, and the limiting opening 4451 interacts with the limit recess 4421 in such a way that the lead screw 442 and the stop washer 445 are circumferentially fixed while the lead screw 442 can axially move relatively to the stop washer 445 by a distance, which can depend on the length of the limit recess 4421. The stop washer 445 further includes at least one mounting head 4453, and the mounting head 4453 is located on an outer periphery of the stop washer 445 and fits with the fixing assembly 420 to limit the rotation of the lead screw 442. In an embodiment, the limiting sleeve 422 includes a limiting portion for accommodating the mounting head 4453, and the mounting head 4453 is embedded in the limiting portion. The limiting portion can be a notch 4431 provided in the limiting sleeve 422 and running through a top end of the limiting sleeve (the notch 4431 herein can be understood as a function of the limiting portion, is not necessarily a notch in configuration, and can also be a bore, a hole, a slot or a protrusion). The mounting head 4453 of the stop washer 445 is embedded in the notch 4431, so that the stop washer 445 is circumferentially fixed to the limiting sleeve 422. In addition, the limiting opening 4451 interacts with the limit recess 4421, so that finally the lead screw 442 only moves up and down, and can not circumferentially rotate, thus also facilitating the installation.

In some embodiments of the present disclosure, the stop washer 445 does not include the mounting hole 4452. In this case, in order to enable the lead screw 442 to pass through the stop washer 445, an entire part below a junction between the lead screw and the stop washer 445 can be the same shape as the limit recess 4421, that is, the limit recess 4421 continuously extends to the lower end of the lead screw 442. In this case, the lower end of the lead screw 442 can directly pass through the stop washer 445 to implement installation. In addition, in order to achieve the objective of "stopping" the lead screw 442 in the circumferential direction, the stop washer 445 can also be directly profiled to be other shapes. The stop washer 445 is not limited to being positioned inside the limiting sleeve 422, and can be arranged on an upper surface of the limiting sleeve 422, that is, a stop recess matching the shape of the mounting head of the stop washer 445 is provided on the upper surface of the limiting sleeve 422, so that after the stop washer 445 is sleeved on the lead screw 442, the mounting head of the stop washer is placed in the stop recess, and thus the stop recess not only limits the rotation of the lead screw 442 in the circumferential direction, but also functions to support the entire stop washer 445.

In addition, the stop washer 445 is not limited to a ring shape, and can also be in the form of a strip. For example, the strip-shaped stop washer 445 includes a clamping portion, and a first stop portion and a second stop portion that are connected to two ends of the clamping portion. The clamping portion is configured to clamp the limit recess 4421 of the lead screw 442, and the first stop portion and the second stop portion each are engaged into the notch 4431 of the limiting sleeve 422, or are engaged into the stop recess on the upper surface of the limiting sleeve 422. In addition, a plurality of, such as two, such stop washers 445 can be provided. The two stop washers 445 are symmetrically arranged, and are located in the same plane or are superposed one on another.

Moreover, the stop washer 445 can also be arranged on the connecting assembly 450 for the case of the lead screw 442. The lead screw 442 is movably connected to the connecting assembly 450. In the case of the movable connection, the upper surface of the connecting assembly 450 may be provided with the stop recess as described above. After the stop washer 445 is sleeved on a top end of the lead screw 442, the limiting opening 4451 matches the limit recess 4421, and the mounting head 4453 is placed in the stop recess. When the lead screw 442, at its upper end, is fixedly connected to or integrally formed with the connecting assembly 450, the stop washer 445 may be dispensed with, because in some cases, the leveling apparatus itself is provided with a positioning assembly which limits the rotation of the connecting assembly 450 and the fixing assembly 420 in the circumferential direction, so that the positioning assembly may be used to limit the rotation of the lead screw 442 in this case.

In an embodiment of the present disclosure, the leveling apparatus includes a steering engine, a nut 441, a fixing frame 421, a stop washer 445 and a lead screw 442, where the steering engine is fixed to the fixing frame 421, and the fixing frame 421 is fixed to a device. A power output shaft of the steering engine is coupled to the lower end of the lead screw 442 by means of the nut 441, and the stop washer 445 is arranged on the upper surface of the fixing frame 421, that is, an upper surface of the fixing frame 421 is provided with the stop recess as described above to fit with the mounting head of the stop washer 445 in order to circumferentially stop the lead screw 442. The upper end of the lead screw 442 directly abuts against the support 100. For relevant parts, reference may be made to the descriptions and contents described in other sections of this specification.

In an embodiment, the transmission assembly 440 further includes bearings 444 and a washer 448. The fixing assembly 420 includes a fixing frame 421 and a limiting sleeve 422, where a boss is provided on the limiting sleeve 422. Each of the bearings 444 is arranged inside the limiting sleeve 422, an outer ring of the bearing 444 abuts against the boss, the bearing 444 is sleeved around the lead screw 442, and an inner ring of the bearing 444 abuts against the nut 441 by means of the washer 448.

The fixing frame 421 includes a top plate and side plates connected to two sides of the top plate. The top plate and the side plates enclose a U-shaped fixing frame 421 with an opening. The opening of the fixing frame 421 faces downward. The driving assembly 430 is connected to the side plates of the fixing frame 421 at the opening of the fixing frame 421, and the top plate is provided with a first opening. One end of the nut 441 is connected to a rotating shaft of the steering engine, and the other end of the nut 441 is located at the first opening. The limiting sleeve 422 is connected to the top plate, a central through hole of the limiting sleeve 422 corresponds to the first opening, a boss is provided inside the limiting sleeve 422, and the bearings 444 is embedded in the central through hole of the limiting sleeve 422. The outer ring of the bearing 444 abuts against a bottom surface of the boss, and the bottom surface of the boss and a top surface outside the first opening jointly restrain the bearing 444, so that the bearing 444 has a stable position in a vertical direction and is easy to mount. The boss may be an annular boss. The nut 441 abuts against the inner ring of the bearing 444 by means of the washer 448, allowing the nut 441 to rotate under the driving of the motor. The lead screw 442 is screwed to the nut 441, the lead screw 442 movably passes through the bearing 444, and the lead screw 442 does not circumferentially rotate. When the nut 441 rotates, an axial threaded pushing action is generated between the nut 441 and the lead screw 442 to cause the lead screw 442 to axially moves, thereby providing the function of transmission. The lead screw 442 slidably abuts against the inner ring of the bearing 444 to prevent the lead screw 442 from waggling, so that the lead screw 442 is coaxial with the nut 441, thus ensuring the accuracy of threaded transmission.

In an embodiment, at least two bearings 444 are provided, and the at least two bearings 444 are superposed one on another. The at least two bearings 444 are superposed in the vertical direction, so that the bearings 444 can limit the lead screw 442 within a larger range and ensure the stability of the lead screw 442. In an embodiment, the transmission assembly 440 further includes a first elastic component 446, and the first elastic component 446 is configured to directly or indirectly apply an elastic force or a contraction force to the lead screw 442.

The first elastic component 446 can be arranged differently in different embodiments.

For example, in an embodiment, a first end of the first elastic component 446 directly or indirectly applies a force to the lead screw 442, and a second end thereof directly or indirectly applies a force to the fixing assembly 420.

In an embodiment in which a boss is provided inside the limiting sleeve 422, the first elastic component 446 is a spring, and the spring is sleeved on the lead screw 442; and a first end of the spring directly or indirectly applies a force to the lead screw 442, and a second end of the spring is placed inside the limiting sleeve 422 and directly or indirectly abuts against the boss.

In an embodiment in which the transmission assembly 440 includes a stop washer 445, the first elastic component 446 is a spring, a second end of the spring abuts against the stop washer 445, the stop washer 445 abuts against the boss, the lead screw 442 movably passes through the connecting assembly 450, the connecting assembly 450 includes a through hole, and the lead screw 442 runs through the through hole; an end portion of the second end of the lead screw 442 has a width greater than a diameter of the through hole; and the first end of the spring abuts against the connecting assembly 450.

In an embodiment of the present disclosure, the function of the first elastic component 446 further includes directly applying an upward thrust to the connecting assembly 450. The lead screw 442 is movably connected to the connecting assembly 450, and the upward thrust applied to the connecting assembly 450 is transmitted to the lead screw 442, so that the lead screw 442 is indirectly subjected to an upward thrust. When the driving assembly 430 drives the nut 442 to rotate and then the nut 441 drives the lead screw 442 to rotate, the rotation of the lead screw 442 is limited due to the presence of the stop washer 445, and thus the rotation is converted into an axial movement. When the axial movement is upward, because the lead screw 442 is movably connected to the connecting assembly 450, the structure of the lead screw (as shown in FIGS. 6, 7, 8, 11, 12, 13, etc.) determines that when moving upwards, the lead screw 442 may not drive the connecting assembly 450 to move upwards together (but this is possible when the lead screw moves downward, because a flange at the upper end of the lead screw 442 is blocked by the connecting assembly 450). In this case, due to the presence of the first elastic component 446, the connecting assembly 450 can be pushed upward to apply a pressure to the upper end of the lead screw 442, so that the connecting assembly 450 closely abuts against the upper end of the lead screw 442. In this case, it is the entire upper surface of the connecting assembly 450 that applies the pressure to the support 100, making the adjustment more stable and reliable.

In an embodiment of the present disclosure, the upper end of the lead screw 442 may be fixedly connected to or integrally manufactured with the connecting assembly 450, which means that the upward and downward axial movement of the lead screw 442 will drive the connecting assembly 450 to move together, thereby adjusting the height of the support 100. In this case, the first elastic component 446 may be dispensed with. It can be understood that when the upper end of the lead screw 442 is integrally manufactured with the connecting assembly 450, it is equivalent to that the flange at the upper end of the lead screw 442 is enlarged on the existing basis, and the connecting assembly 450 is dispensed with.

In this embodiment of the present disclosure, the upper end of the lead screw 442 is still movably connected to the connecting assembly 450. Specifically, the upper end of the lead screw 442 may abut against the connecting assembly 450, one end of the first elastic component 446 is hung on the connecting assembly 450, and the other end thereof is hung on the fixing assembly 420 (which may be specifically the limiting sleeve 422). And, in operation, the first elastic component 446 provides a contraction force, and because the fixing assembly 420 is fixed, a pulling force is naturally applied to the connecting assembly 450. This pulling force can pull back the connecting assembly 450, and because the upper end of the lead screw 442 abuts against the connecting assembly 450, the force pulling back the connecting assembly 450 is indirectly applied to the lead screw 442. In this way, when the driving assembly 430 drives the nut 441 to rotate, and then the nut 441 drives the lead screw 442 to rotate, due to the presence of the stop washer 445, the rotation of the lead screw 442 is limited, and thus is converted into an axial movement. When the axial movement is upward, the upward movement of the lead screw 442 stretches the first elastic component 446 and pushes the connecting assembly 450 to move upwards together, so that the connecting assembly 450 pushes the support 100 to move, thereby adjusting the height of the support 100; when the axial movement is downward, upon the downward axial movement of the lead screw 442, the connecting assembly 450 is pulled back downward under an action of the first elastic component 446, so that the connecting assembly continues to keep closely abutting against and in connection with the upper end of the lead screw 442, and thus the support for the support 100 is weakened, thereby adjusting the height of the support 100. In order to better implement following movements of the connecting assembly 450 and the upper end of the lead screw 442, the connecting assembly 450 may be provided with a groove. The groove is configured to accommodate the upper end of the lead screw 442, and a side wall of the groove also acts as a guide rail. When the lead screw 442 moves downward, the connecting assembly 450 follows to move downward smoothly under the guidance of the groove, and the presence of the groove further makes the top end of the lead screw 442 abut against the connecting assembly 450 more reliably, reducing the slipping of the top end of the lead screw 442 from the connecting assembly 450.

It should be noted that the movable connection between the connecting assembly 450 and the upper end of the lead screw 442 has its own advantages over fixed connection or integral forming. The movable connection has the advantage of a certain fault tolerance. The fault tolerance herein refers to the tolerance to uneven contact between the connecting assembly 450 and the support 100, that is, the connecting assembly 450 is not attached well to the support 100 after being installed, for example, line contact, a point contact, etc. instead of surface contact. In this case, if the connecting assembly 450 is fixedly connected to or integrally formed with the upper end of the lead screw 442, the axial movement of the lead screw 442 applies a non-uniform force to the support 100 by means of the connecting assembly 450, resulting in a position error which causes an error in adjustment or less robust support of the connecting assembly 450 for the support 100 after the adjustment. In the case of the movable connection, when an elastic force is applied to the first elastic component 446 during the axial movement of the lead screw 442, the contact between the connecting assembly 450 and the support 100 can be automatically matched to the surface contact under constraining application of the elastic force, so that the height of the support 100 can be adjusted by a force applied by the entire surface. One of the reasons why the connecting assembly 450 can have this automatic matching margin is that the connection between the connecting assembly 450 and the upper end of the lead screw 442 is the movable connection. Similarly, the case where a contraction force is applied by the first elastic component 446 may also be understood by analogy.

In this embodiment of the present disclosure, the first elastic component 446 can be a spring which may be sleeved on the lead screw 442 or may not be sleeved on the lead screw 442, that is, outside the lead screw 442. For example, the spring may be placed between the connecting assembly 450 and the fixing assembly 420, and particularly arranged between the connecting assembly 450 and the limiting sleeve 422. The upper surface of the limiting sleeve 422 may be provided with a first recess to accommodate a lower end of the spring, and the lower surface of the connecting assembly 450 is provided with a second recess at a position corresponding to the first recess, to accommodate an upper end of the spring. In this circumstance, the spring may only be placed between the two recesses, and applies an elastic force in operation. Even in some circumstances, the spring may further pass through or avoid the limiting sleeve 422 and be arranged between the connecting assembly 450 and the fixing frame 421. For the specific arrangement structure, reference may be made to the foregoing description. In another circumstance, if the spring is required to apply a contraction force, it is only necessary to provide a structure such as a ring, a pore or a hole for hooking the spring at the first recess and the second recess.

In an embodiment of the present disclosure, the upper end of the spring may directly abut against the upper end of the lead screw 442, and the lower end thereof may abut against the fixing assembly 420. As such, one of the effects is to eliminate a clearance between the threads of the lead screw 442 and the nut 441. In addition, the lower end of the spring may not directly abut against the fixing assembly 420, but first abut against the stop washer 445, and then the stop washer 445 abuts against the fixing assembly 420.

In order to ensure that the connecting assembly 450 moves up and down without rotation around the lead screw 442, limiting structures for two types of connecting assemblies 450 are described in detail below.

Firstly, the transmission assembly 440 further includes limit screws 447, the connecting assembly 450 has a plate-like structure, the limit screws 447 movably pass through the connecting assembly 450 and are fixed to the limiting sleeve 422, and the connecting assembly 450 is movable within a preset range relative to the limit screws 447.

The limit screws 447 are shoulder screws, or stop screws. The shoulder screw includes a screw head and a screw rod, where the screw rod includes an external thread region and a cylindrical region, the cylindrical region is closer to the screw head than the external thread region, the connecting assembly 450 is provided with a through hole, the shoulder screw is connected to the fixing assembly 420 by means of the external thread region, and the cylindrical region of the shoulder screw passes through the through hole, so that the connecting assembly 450 is movable within the cylindrical region.

An outer wall of a section of the screw rod away from the head is provided with external threads, a section between the external threads and the head is the cylindrical region that has a smooth outer wall. Specifically, three shoulder screws may be provided, the connecting assembly 450 is provided with three through holes, and each through hole has a diameter slightly greater than the maximum outer diameter of the cylindrical region of the shoulder screw, for example, by 0.5 mm. The shoulder screw passes through the through hole and then is screwed and fixed in a screw hole in a top end of the limiting sleeve 422. The connecting assembly 450 can move in the vertical direction along the cylindrical region, and has a movement range limited by the head of the shoulder screw and the limiting sleeve 422, which prevents influences on printing effects caused by an excessively large angle of inclination of the support 100 due to an excessive movement range of the connecting assembly 450, and prevents damages caused by excessive squeezing between the support 100 and the base frame 200.

In an embodiment, the lead screw 442 is a countersunk bolt, the head of the lead screw 442 is embedded in the connecting assembly 450, and the heads of the three shoulder screws each are embedded in the connecting assembly 450, so that a top surface of the connecting assembly 450 is flat, and the top surface of the connecting assembly 450 abuts against a bottom surface of the support 100. The support 100 is provided with connecting through holes, and the connecting assembly 450 is provided with screw holes. The connecting assembly 450 is connected to the support 100 by means of connecting bolts. Specifically, three connecting bolts may be provided.

In an embodiment, as an example, four leveling apparatuses 300 are provided, two of the leveling apparatuses 300 as a group correspond to a first side edge of the middle light-transmitting opening 201, and the first side edge is provided with a limiting block 220 and two connecting blocks 210 extending to the center of the middle light-transmitting opening 201. The connecting blocks 210 correspond to the leveling apparatuses 300, and the connecting blocks 210 are elongated. The connecting blocks 210 are configured to be inserted into hollow regions between the leveling module 400 and the measurement module 500, and each of the connecting blocks 210 is provided with a screw hole. The shoulder screws pass through the through holes provided in the connecting assembly 450 and the screw holes in the top end of the limiting sleeve 422, and then are screwed into the screw holes of the connecting blocks 210, to serve for fixing the limiting sleeve 422 to the connecting blocks 210, which in turn fixes the leveling apparatuses 300, makes the installation simple, and makes it easy for the leveling apparatuses 300 to disassemble, adjust and maintain. The limiting block 220 is located between the two connecting blocks 210, and the limiting block 220 is configured to fit, between two leveling apparatuses 300, with the edge of the middle light-transmitting opening 201 to limit the two leveling apparatuses 300, and the limiting block 220 is provided with screw holes. The shoulder screws pass through the through holes provided in the connecting assembly 450 and the screw holes in the top end of the limiting sleeve 422, and then are screwed into the screw holes in the limiting block 220 to serve for fixing the limiting sleeve 422 to the limiting block 220, which in turn makes the positions of the leveling apparatuses 300 more stable and prevents waggling. In the foregoing connection type, the fixing assembly 420, the driving assembly 430 and a part of the transmission assembly 440 are all located on a side of the base frame 200 that face away from the support 100, that is, in the base, so that the distance between the base frame 200 and the support 100 is reduced, the unstable position of the support 100 is avoided, and the 3D printer has a neat appearance.

Figure 11:
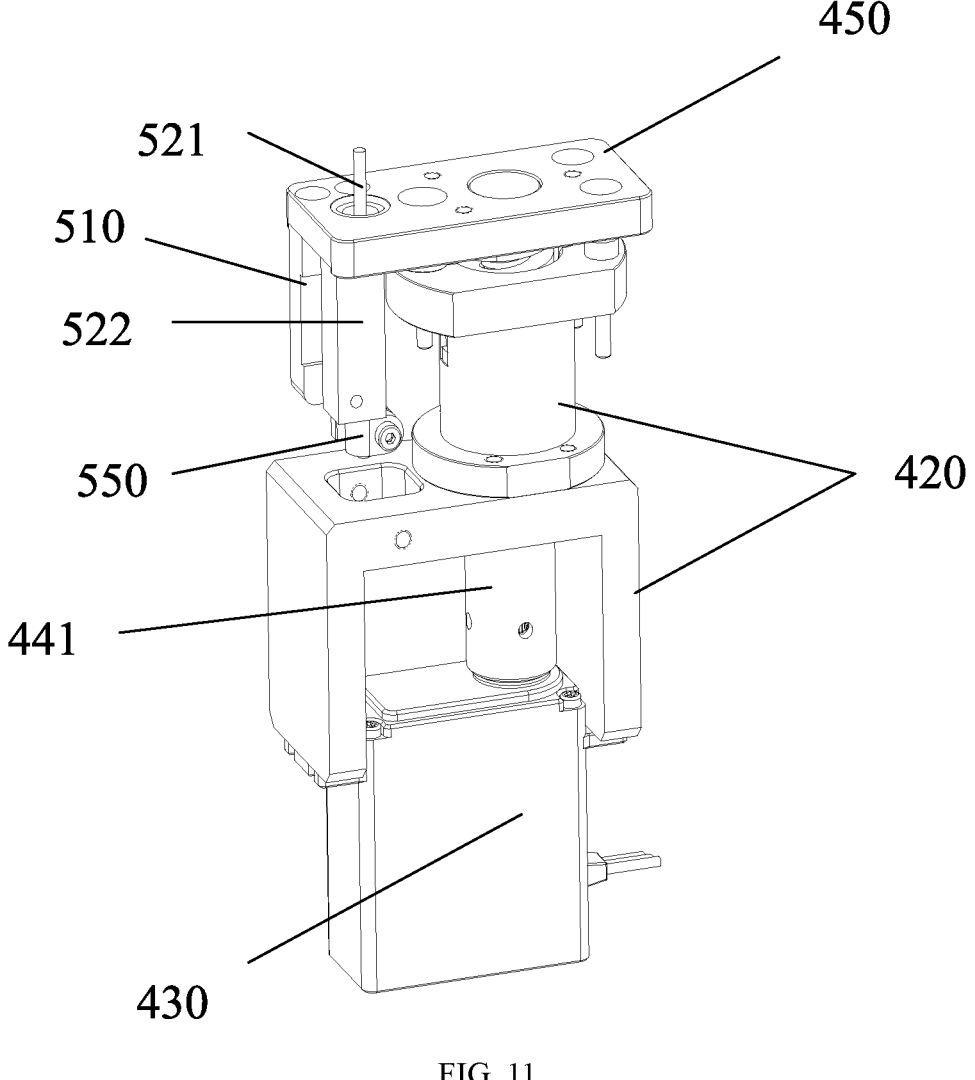
FIG. 11 is a schematic diagram of an overall structure of another leveling apparatus according to an embodiment of the present disclosure.
Figure 12:
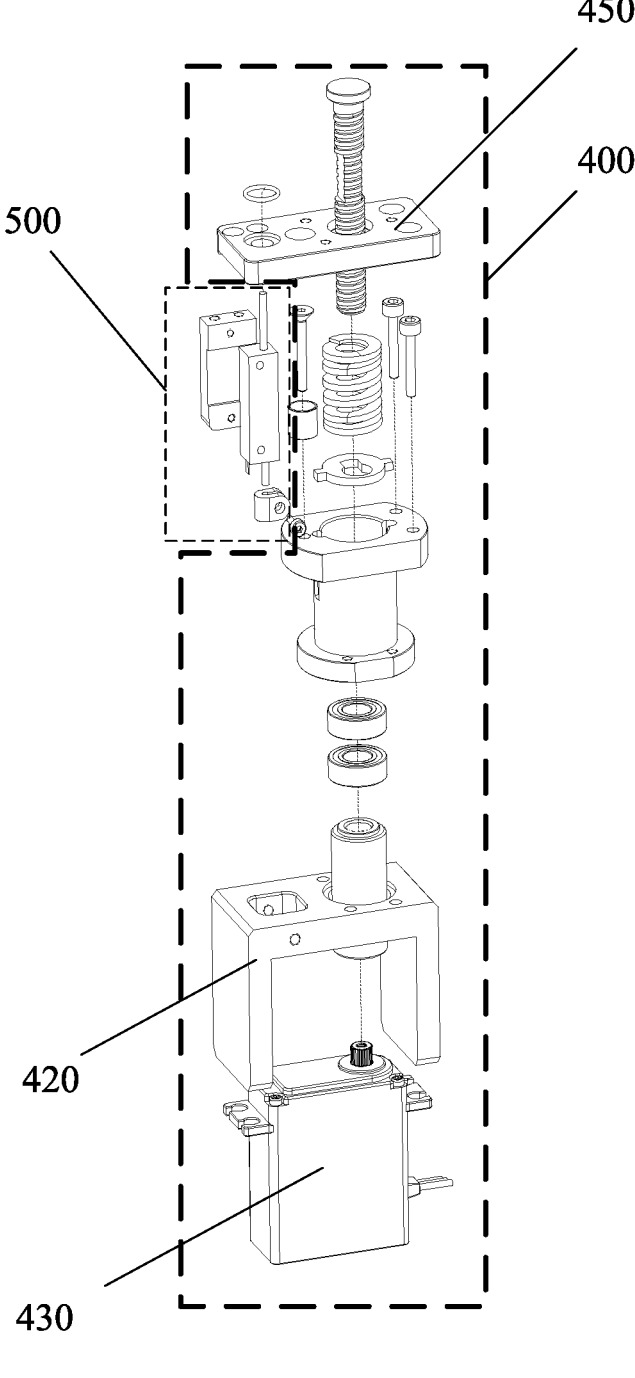
FIG. 12 is a schematic exploded view of a composition structure of the another leveling apparatus according to an embodiment of the present disclosure.
Figure 13:
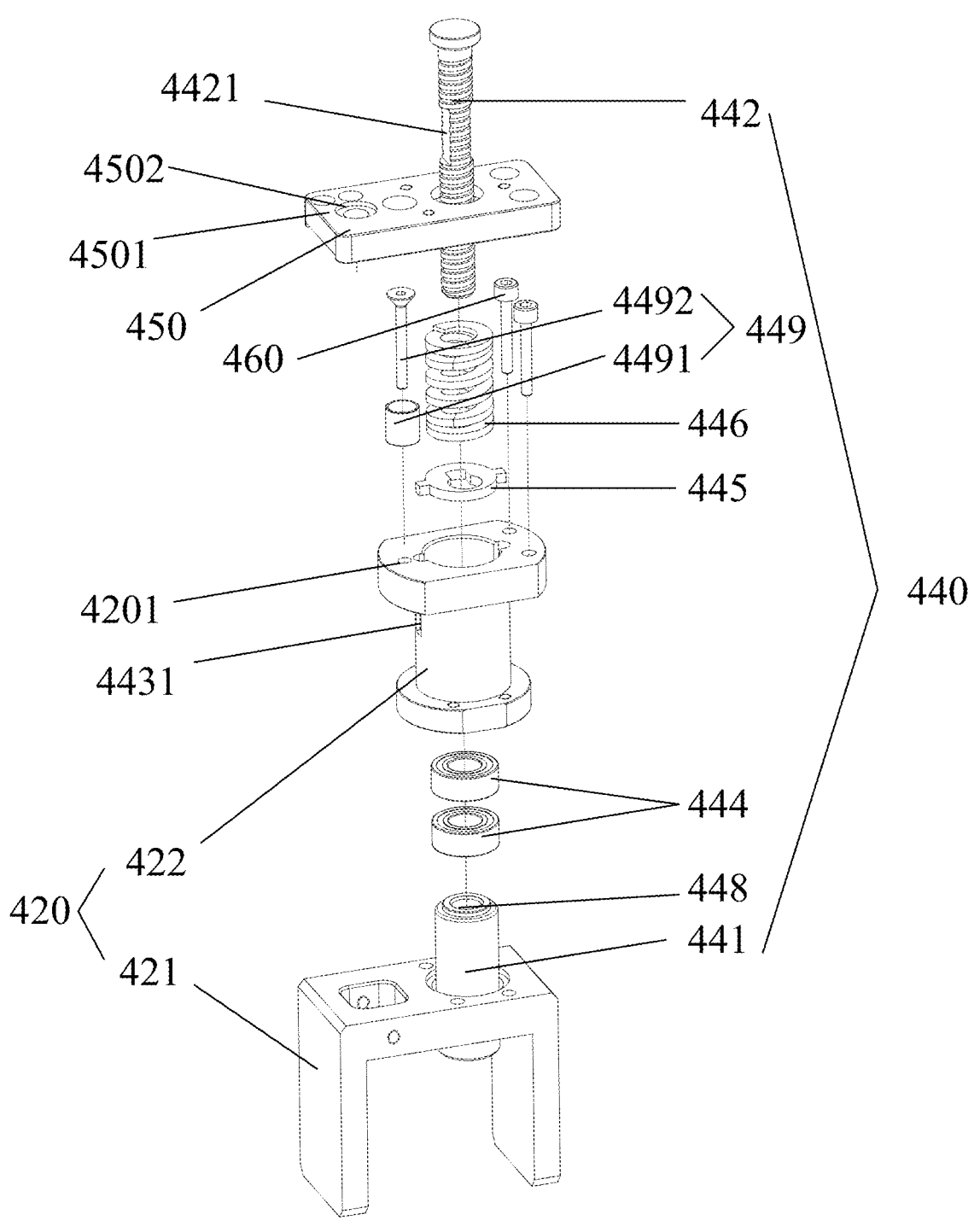
FIG. 13 is an another schematic exploded view of a composition structure of the leveling module according to an embodiment of the present disclosure.

Secondly, as shown in FIGS. 11-13, the transmission assembly 440 further includes a positioning assembly 449, where the positioning assembly 449 is arranged between the connecting assembly 450 and the fixing assembly 420, one end of the positioning assembly 449 extends into the connecting assembly 450, and the other end of the positioning assembly 449 extends into the fixing assembly 420. As in an embodiment, a side of the connecting assembly 450 opposite to the fixing assembly 420 is provided with positioning grooves/holes, one end of the positioning assembly 449 is connected to the fixing assembly 420, the other end of the positioning assembly 449 is movably inserted into the positioning grooves/holes, and the positioning assembly 449 is configured to limit a movement direction of the connecting assembly 450.

The positioning assembly 449 includes a positioning sleeve 4491 and a positioning bolt 4492. The positioning groove is a cylindrical groove, and the positioning bolt 4492 is a flat head bolt. The positioning bolt 4492 passes through the positioning sleeve 4491 and then is fixed to the limiting sleeve 422, so that the positioning sleeve 4491 and the limiting sleeve 422 are fixed in position. A top end of the positioning sleeve 4491 is inserted into the positioning groove and can move in an axial direction of the positioning groove. It is ensured that the connecting assembly 450 can move up and down for leveling while the connecting assembly 450 is prevented from rotating around the lead screw 442, that is, the positioning sleeve 4491 and the lead screw 442 jointly act on the connecting assembly 450, so that the connecting assembly 450 can only move in a vertical direction without rotation in a horizontal plane, and the support 100 connected to the connecting assembly 450 is prevented from waggling. It can be understood that the above positioning groove can also be a positioning hole. When a positioning groove is provided, the depth of the positioning groove should provide a certain distance to avoid interference with the positioning sleeve 4491 when the connecting assembly 450 moves downward.

In this embodiment of the present disclosure, the connecting assembly 450 is provided with a first positioning hole 4501, and the fixing assembly 420 is provided with a second positioning hole 4201 at a position corresponding to the first positioning hole; and the positioning assembly 449 includes a positioning bolt 4492, and the positioning bolt 4492 passes through the first positioning hole and the second positioning hole 4201. A supporting step 4502 is provided in the first positioning hole or the second positioning hole 4201, and the supporting step 4502 is configured to support an end of the positioning bolt 4492 such that two ends of the positioning bolt 4492 are respectively positioned in the first positioning hole and the second positioning hole 4201. Specifically, the supporting step 4502 can be provided in the first positioning hole, the supporting step 4502 faces the support 100, and the positioning bolt 4492 is a flat head bolt (that is, an end of a cylindrical bolt body has a flat head structure similar to a bolt head). The positioning bolt 4492 has a head at the top, and passes through the first positioning hole and into the second positioning hole 4201 from top down. During the process, because the head is relatively larger, the head is blocked and supported by the supporting step 4502, thus forming a structure in which one end of the positioning bolt 4492 is located in the first positioning hole and the other end thereof is located in the second positioning hole 4201. Alternatively, the supporting step 4502 can also be provided in the second positioning hole 4201. In this case, the supporting step 4502 faces the connecting assembly 450, and the positioning bolt 4492 has a bolt head in the middle, and a columnar bolt body extends from the bolt head on two sides. In use, one end of the positioning bolt 4492 is inserted into the second positioning hole 4201, and because of the presence of the supporting step 4502, the head is blocked and supported and may not move downward any more; and the other end thereof is inserted into the first positioning hole.

In this embodiment of the present disclosure, the positioning assembly 449 includes a positioning sleeve 4491 and a positioning bolt 4492, where the positioning sleeve 4491 is positioned between the fixing assembly 420 and the connecting assembly 450 and corresponds to the first positioning hole and the second positioning hole 4201, and the positioning bolt 4492 passes through the first positioning hole, the second positioning hole 4201 and the positioning sleeve 4491; and the positioning sleeve 4491 is at least partially located in the first positioning hole, and an end of the positioning sleeve 4491 located in the first positioning hole supports a corresponding end of the positioning bolt 4492. Specifically, the positioning sleeve 4491 has a diameter less than an inner diameter of the first positioning hole, so that an upper end of the positioning sleeve may be inserted into the first positioning hole. The head of the positioning bolt 4492 has a diameter greater than a diameter of the positioning sleeve 4491, so that when the positioning bolt 4492 passes through the first positioning hole, the positioning sleeve 4491 and the second positioning hole 4201 from top down, the head will be blocked and supported by the upper end of the positioning sleeve 4491.

In an embodiment, as shown in FIG. 12, the leveling module 400 further includes two mounting bolts 460, and the two mounting bolts 460 are used with the positioning bolt 4492 to mount the limiting sleeve 422 on the base frame 200. As an example, four leveling apparatuses 300 are provided, two of the leveling apparatuses 300 as a group correspond to a first side edge of the middle light-transmitting opening 201, and the first side edge is provided with a limiting block 220 and two connecting blocks 210 extending to the center of the middle light-transmitting opening 201. The connecting blocks 210 correspond to the leveling apparatuses 300, and the connecting blocks 210 are elongated. The connecting blocks 210 are configured to be inserted into hollow regions between the leveling module 400 and the measurement module 500, and each of the connecting blocks 210 is provided with a screw hole. The positioning bolts 4492 pass through the through holes provided in the positioning sleeve 4491 and the limiting sleeve 422, and then are screwed into the screw holes of the connecting blocks 210, to serve for fixing the limiting sleeve 422 to the connecting blocks 210, which in turn fixes the leveling apparatuses 300, makes the installation simple, and makes it easy for the leveling apparatuses 300 to disassemble, adjust and maintain. The limiting block 220 is located between the two connecting blocks 210, and the limiting block 220 is configured to fit, between two leveling apparatuses 300, with the edge of the middle light-transmitting opening 201 to limit the two leveling apparatuses 300, and the limiting block 220 is provided with screw holes. The mounting bolts 460 pass through the through holes provided in the limiting sleeve 422, and then are screwed into the screw holes in the limiting block 220 to serve for fixing the limiting sleeve 422 to the limiting block 220, which in turn makes the positions of the leveling apparatuses 300 more stable and prevents waggling.

There may be various structures for the measurement module 500, and the position of the measurement module 500 is fixed relative to the leveling module 400. Two specific forms of the measurement module 500 are exemplified below.

Figure 14:
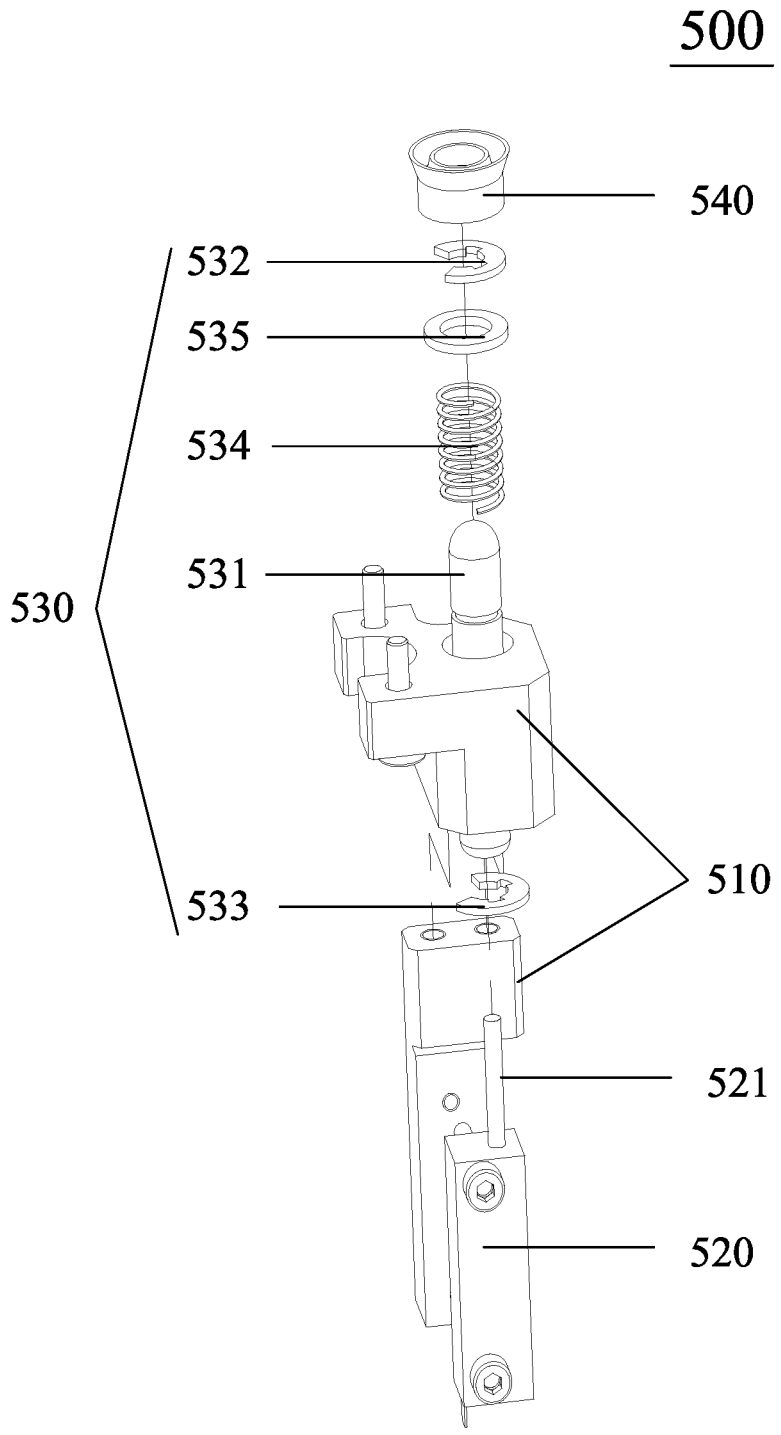
FIG. 14 is a schematic exploded view of a composition structure of a measurement module according to an embodiment of the present disclosure.

Firstly, as shown in FIG. 14, the measurement module 500 includes a support seat assembly 510, a displacement sensor 520 and a measurement rod assembly 530. The displacement sensor 520 is connected to the support seat assembly 510, the measurement rod assembly 530 is movably connected to the support seat assembly 510, a first end of the measurement rod assembly 530 is opposite to a probe 521 of the displacement sensor 520, and a second end of the measurement rod assembly 530 protrudes from a surface of the support 100 and is configured for contact with a target leveling component. The measurement rod assembly 530 is configured to push the probe of the displacement sensor 520 to generate measurement information. The support seat assembly 510 is connected to the support 100, or the support seat assembly 510 is connected to the connecting assembly 450.

The support seat assembly 510 is connected to the connecting assembly 450 or the support 100, so that the measurement module 500 is linked with the support 100, that is, the measurement module 500 is lifted or lowered synchronously with the support 100, and thus the measurement module 500 reflects the actual height of the support 100 in real time. The support seat assembly 510 may specifically include a support seat and a sensor holder, where the support seat is connected to the connecting assembly 450, the displacement sensor 520 is fixed by the sensor holder, and the sensor holder is connected to the support seat. The displacement sensor 520 is configured to convert a vertical displacement of the measurement rod assembly 530 into a voltage signal, that is, the measurement information. The displacement sensor 520 may be a grating displacement sensor, a magnetic displacement sensor, or the like. When the displacement sensor 520 is a magnetic displacement sensor, the displacement sensor 520 includes a sensor housing which is connected to the sensor holder. A waveguide tube and a movable magnetic ring sleeved on the waveguide tube are provided inside the sensor housing, the movable magnetic ring is connected to the probe 521, and the probe 521 movably passes through the sensor housing. A sensitive element in the waveguide tube is made of a special magnetostrictive material, and current pulses are transmitted by an electron chamber inside the waveguide, thus generating a circumferential magnetic field outside the waveguide. This magnetic field intersects with a magnetic field generated by the magnetic ring. When the probe 521 abuts against a bottom end of a measurement rod 531 in the measurement rod assembly 530 and moves in the vertical direction, the probe drives the magnetic ring to move relative to the waveguide, and a strain mechanical wave pulse signal is generated inside the waveguide tube by means of magnetostrictive effects. Then, the distance by which the magnetic ring moves relative to the waveguide may be determined from measurement time, and thus the distance by which the measurement rod 531 has moved may be determined based on the movement distance. When the printing platform 600 is lowered to a certain level, an angle of the forming surface of the printing platform 600 may be determined based on the movement distance of the measurement rods 531 in the measurement modules 500 at different positions.

The top plate of the fixing frame 421 of the fixing assembly 420 is further provided with a second opening into which and the sensor holder and the displacement sensor 520 are inserted, resulting in a overall compact structure of the leveling apparatus 300.

Figures 15, 16:
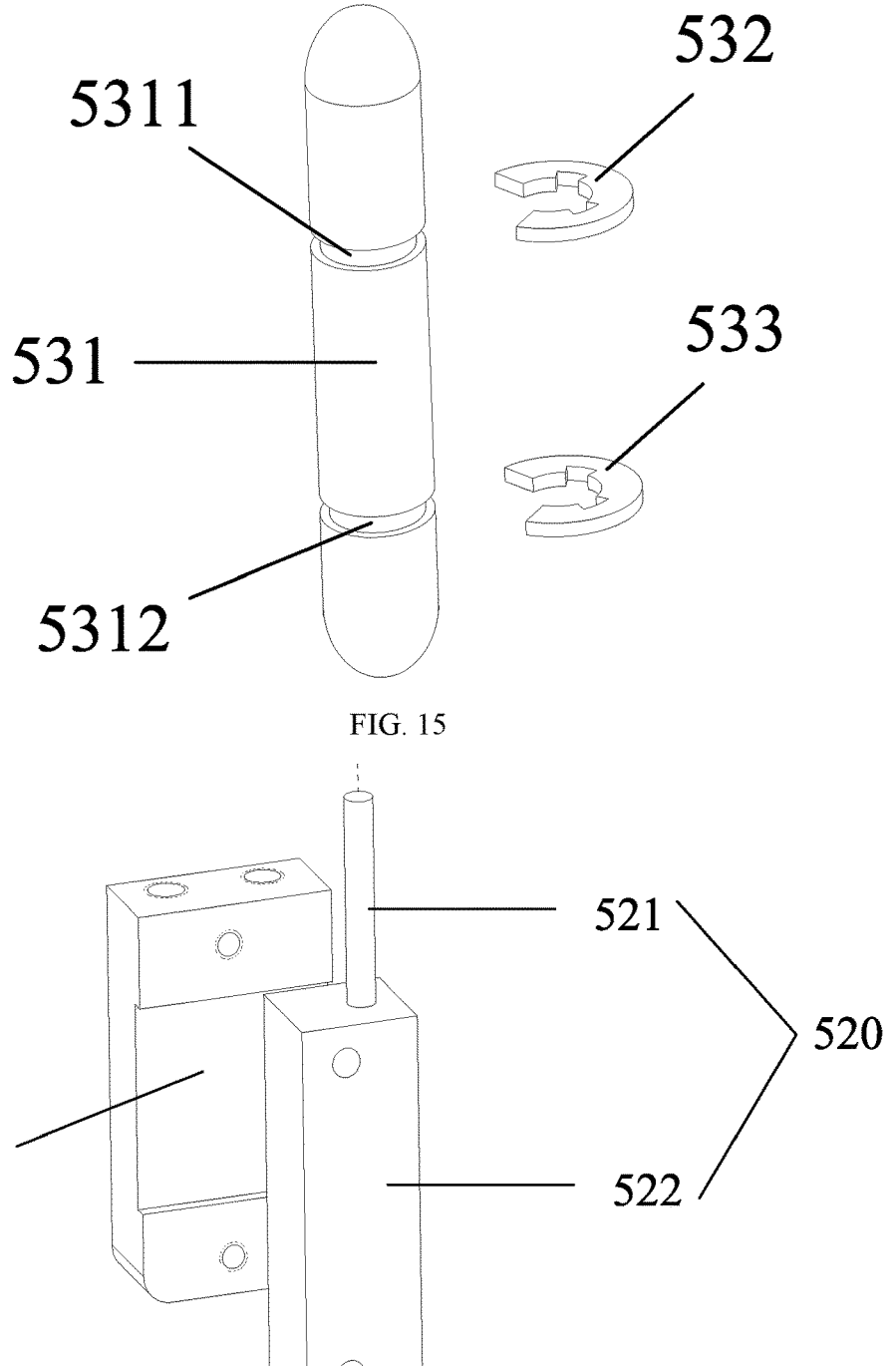
FIG. 15 is a schematic structural diagram of a measurement rod, a first clamp spring and a second clamp spring according to an embodiment of the present disclosure.
FIG. 16 is a schematic exploded view of a composition structure of another measurement module according to an embodiment of the present disclosure.

In an embodiment, as shown in FIG. 15, the measurement rod assembly 530 includes a measurement rod 531, a first clamp spring 532, a second clamp spring 533, and a second elastic component 534. The support seat assembly 510 includes a penetrating through hole. The measurement rod 531 is provided with a first clamping slot 5311 and a second clamping slot 5312, the measurement rod 531 movably passes through the penetrating through hole of the support seat assembly 510, a first end of the measurement rod 531 is opposite to the probe 521 of the displacement sensor 520, a second end of the measurement rod 531 protrudes from the surface of the support 100, the first clamping slot 5311 and the second clamping slot 5312 are respectively located on two sides of the support seat assembly 510, the first clamp spring 532 is engaged into the first clamping slot 5311, the second clamp spring 533 is engaged into the second clamping slot 5312, the second elastic component 534 is arranged between the support seat assembly 510 and the first clamp spring 532, and the maximum outer diameter of the first clamp spring 532 and the maximum outer diameter of the second clamp spring 533 are both greater than the maximum inner diameter of the penetrating through hole. The first clamp spring 532 and the second clamp spring 533 are configured to limit a movement range of the measurement rod 531 relative to the support seat assembly 510, and the second elastic component 534 is configured to apply an elastic force to the measurement rod 531 by means of the first clamp spring 532.

The support seat is provided with a through hole, a support seat boss is provided in the through hole, and the measurement rod 531 movably passes through the through hole. The first clamp spring 532 and the second clamp spring 533 each have an approximately annular structure with an opening. The first clamp spring 532 is engaged into the first clamping slot 5311 through the opening, the second clamp spring 533 is engaged into the second clamping slot 5312 through the opening, the first clamp spring 532 is located above the through hole of the support seat, and the second clamp spring 533 is located below the through hole of the support seat, so that the measurement rod 531 is not separated from the through hole and the position of the measurement rod 531 is limited. The measurement rod assembly 530 further includes a spring washer 535, one end of the second elastic component 534 is inserted into the through hole of the support seat and abuts against an upper surface of the support seat boss, and the other end of the second elastic component 534 abuts against the first clamp spring 532. The second elastic component 534 is compressed when the measurement rod 531 is subjected to a pressing action of the printing platform 600, so that the measurement rod 531 moves downward and acts on the displacement sensor 520. At the end of leveling, the printing platform 600 is separated from the measurement rod 531, and the second elastic component 534 is configured for return of the measurement rod 531 to cause the measurement rod 531 to protrude from the upper surface of the support 100.

In an embodiment, as shown in FIGS. 5, 6, 14 and 17, the measurement module 500 further includes a seal 540, the support 100 is provided with a measurement opening, the seal 540 is arranged at the measurement opening, the measurement rod assembly 530 passes through the seal 540, and the measurement rod assembly 530 and the seal 540 may move relative to each other. The seal 540 is configured to seal between the measurement opening and the measurement rod assembly 530.

The seal 540 is configured to prevent printing resin from flowing from between the measurement rod assembly 530 and the measurement opening to the measurement module 500, to prevent the printing resin from being cured between the measurement rod assembly 530 and the measurement opening and affecting the flexible movement of the measurement rod assembly 530, and to ensure effective operations of the measurement module 500.

In an embodiment, the measurement opening is a circular opening, and the seal 540 includes a connecting part 541, a first sealing piece 542 and a second sealing piece 543. The connecting part 541 is cylindrical, and both the first sealing piece 542 and the second sealing piece 543 are annular. Both the first sealing piece 542 and the second sealing piece 543 are connected to a top end of the connecting part 541, and the first sealing piece 542 is at a preset angle with respect to the second sealing piece 543, so that a V-shaped groove is formed between the first sealing piece 542 and the second sealing piece 543. The V-shaped groove has an opening at a top end away from the connecting part 541, so that the first sealing piece 542 and the second sealing piece 543 may move elastically at their ends away from the connecting part 541. The connecting part 541 is connected to the measurement opening, and a top end of the first sealing piece 542 abuts against the measurement rod 531. Because the top end of the first sealing piece 542 may move elastically, the measurement rod 531 may move axially relative to the first sealing piece 542, and a sealing effect is ensured. Moreover, the first sealing piece 542 and the second sealing piece 543 may move elastically relative to each other, so that the measurement rod 531 has a certain radial movement space, thereby preventing collision and squeezing between the measurement rod 531 and a side wall of the measurement opening when the measurement rod is subjected to an inclined external force, which hinders the axial movement of the measurement rod 531. The V-shaped groove is formed between the first sealing piece 542 and the second sealing piece 543 functions to receive the resin and prevent the printing resin from flowing. The preset angle may be 60°.

Secondly, as shown in FIGS. 11, 12 and 16, the measurement module 500 includes a displacement sensor 520, where the displacement sensor 520 includes a sensor body 522 and a probe 521 passing through the sensor body 522, two ends of the probe 521 being exposed from the sensor body 522. One end of the probe 521 is used to be in contact with the printing platform 600, and the other end thereof is provided with a limiting member 550.

One end of the probe 521 is a top end of the probe 521, and the other end of the probe 521 is a bottom end of the probe 521. The amount of movement of the probe 521 relative to the sensor body 522 is a stroke of the displacement sensor 520. According to a principle of the displacement sensor 520, a higher measurement precision is provided in a stroke section in the total stroke of the displacement sensor 520. For example, when the total stroke of the displacement sensor 520 is 10 mm, the stroke of the displacement sensor 520 with higher measurement precision is greater than or equal to 5 mm and less than or equal to 10 mm. In order to ensure that the stroke of the displacement sensor 520 is greater than or equal to 5 mm, the probe 521 is pushed downward to a position with a stroke of 5 mm, a limiting member 550 is connected to the bottom end of the probe 521, and the limiting member 550 abuts against the bottom end of the sensor body 522, so that the probe 521 can only move downward under an action of the forming surface, that is, the probe does not move upward when the stroke continues to be increased on the basis of 5 mm. This ensures that the stroke of the probe 521 is greater than or equal to 5 mm and less than or equal to 10 mm, and ensures the measurement precision of the displacement sensor 520.

In an embodiment, the limiting member 550 includes a collet 551 and a fastening screw 552, where the collet 551 is provided with a clamping opening, the probe 521 passes through the clamping opening, and the fastening screw 552 is connected to the collet 551 to adjust the opening of the clamping opening to cause the clamping opening to clamp the probe 521.

In use, the stroke of the probe 521 can be restricted only by inserting the probe 521 into the clamping opening and tightening the fastening screw 552, making the installation simple.

In an embodiment, the measurement module 500 further includes a support seat assembly 510, where the support seat assembly 510 is connected to the support 100, and the displacement sensor 520 is connected to the support seat assembly 510. Alternatively, the measurement module 500 further includes a support seat assembly 510, the leveling module 400 further includes a connecting assembly 450, and the transmission assembly 440 is connected to the support 100 by means of the connecting assembly 450. The support seat assembly 510 is connected to the connecting assembly 450, the displacement sensor 520 is connected to the support seat assembly 510, the connecting assembly 450 is provided with a probe penetrating opening 451, and an end of the probe 521 movably passes through the probe penetrating opening 451 to come into contact with the printing platform 600.

The support seat assembly 510 is connected to the connecting assembly 450 or the support 100, so that the measurement module 500 is linked with the support 100, that is, the measurement module 500 is lifted or lowered synchronously with the support 100, and thus the measurement module 500 reflects the actual height of the support 100 in real time. The sensor body 522 is fixed to the support seat assembly 510, and two ends of the probe 521 protrude from the sensor body 522. The probe 521 passes through the probe penetrating opening 451, and the top end of the probe 521 protrudes from the surface of the support 100. The top end of the probe 521 is configured to be in contact with the forming surface of the printing platform 600 and to move relative to the sensor body 522 under an action of the forming surface of the printing platform 600. The sensor body 522 is configured to convert a vertical displacement of the probe 521 into a voltage signal, that is, measurement information. The displacement sensor 520 may be the above grating displacement sensor, magnetic displacement sensor, or the like. The probe 521 of the displacement sensor 520 is configured to be in direct contact with the forming surface, resulting in a simpler structure of the measurement module 500 and preventing an installation error.

In an embodiment, as shown in FIG. 18, the measurement module 500 further includes a seal ring 560, an opening edge of the probe penetrating opening 451 is provided with a mounting recess, the seal ring 560 is embedded in the mounting recess, and the seal ring 560 protrudes from the connecting assembly 450. The probe 521 movably passes through the seal ring 560, and the seal ring 560 is configured to abut against the support 100 for sealing between the connecting assembly 450 and the support 100.

The seal ring 560 can be made of a rubber material. When the connecting assembly 450 and the support 100 are installed, the seal ring 560 is pressed and then clings to the lower surface of the support 100 to function to provide sealing between the connecting assembly 450 and the support 100 and prevent the resin from flowing into the base through the gap between the connecting assembly 450 and the support 100.

An embodiment of the present disclosure further provides a 3D printer, including the supporting assembly according to any one of the foregoing embodiments, a base, and a light source assembly, where the supporting assembly is connected to the base, the light source assembly is arranged in the base, and light emitted by the light source assembly is projected on a light-transmitting region 110 of the support 100.

The 3D printer includes the supporting assembly according to any one of the foregoing embodiments, including the features and advantages of the supporting assembly according to any one of the foregoing embodiments. Details are not repeated herein again.

The 3D printer further includes a printing platform 600, a guide assembly and a power assembly, where the guide assembly is connected to the base, the printing platform 600 is connected to the guide assembly and the power assembly, and the printing platform 600 is configured to be driven by the power assembly to rise or fall along the guide assembly. It can be understood that the printing platform 600 has a dimension greater than an area of the light-transmitting region, so that the printing platform 600 can act on a leveling apparatus 300 outside the light-transmitting region.

In an embodiment, the present disclosure further provides a measurement module 500 for leveling a 3D printer. The measurement module 500 includes a displacement sensor 520, where the displacement sensor 520 includes a sensor body and a probe 521 passing through the sensor body, two ends of the probe 521 being exposed from the sensor body. One end of the probe 521 is used to be in contact with the printing platform 600, and the other end thereof is provided with a limiting member 550.

In an embodiment, the present disclosure further provides another measurement module 500 for leveling a 3D printer. The measurement module 500 includes a support seat assembly 510, a displacement sensor 520, and a measurement rod assembly 530. The displacement sensor 520 is connected to the support seat assembly 510, the measurement rod assembly 530 is movably connected to the support seat assembly 510, a first end of the measurement rod assembly 530 is opposite to a probe 521 of the displacement sensor 520, and a second end of the measurement rod assembly 530 protrudes from a surface of the support 100 and is configured for contact with a target leveling component. The measurement rod assembly 530 is configured to push the probe of the displacement sensor 520 to generate measurement information.

The measurement module 500 can be the measurement module 500 according to any one of the embodiments of the supporting assembly or the leveling apparatus 300, the measurement module including the features and advantages of the measurement module 500 in the supporting assembly or the leveling apparatus 300 according to any one of the foregoing embodiments.

It can be understood that associated parts of the foregoing embodiments can be mutually referenced or crossed, so that from the point of view of those of ordinary skill in the art, some new embodiments can be formed through combination, and these embodiments are still within the scope of protection of the present disclosure.

The above descriptions are merely particular embodiments of the present disclosure, but the scope of protection of the present disclosure is not limited thereto. Any changes or substitutions that can be readily conceived by those skilled in the art within the technical scope disclosed by the present disclosure shall fall within the scope of protection of the present disclosure. Therefore, the scope of protection of the present disclosure should be subject to the scope of protection of the claims.

What is claimed is:

1. A leveling apparatus for leveling a 3D printer, comprising a leveling module, wherein
the leveling module is configured to push and/or pull back a target component in a first direction under a control of an electrical signal;
the leveling module comprises a driving assembly and a transmission assembly, wherein a first end of the transmission assembly is connected to the driving assembly, and a second end of the transmission assembly is configured to be directly or indirectly connected to the target component; and
the driving assembly is connected to the transmission assembly to drive the transmission assembly to move, so as to push and/or pull back the target component in the first direction,
wherein the leveling apparatus further comprises a measurement module, wherein the measurement module is configured for measuring position information of a target leveling component in the first direction, and relative positions of the measurement module and the leveling module are fixed,
wherein the measurement module comprises a support seat assembly, a displacement sensor, a measurement rod assembly, and a seal;
the support seat assembly is connected to the target component, the displacement sensor is connected to the support seat assembly, the measurement rod assembly is connected to the support seat assembly, a first end of the measurement rod assembly is opposite to a probe of the displacement sensor, a second end of the measurement rod assembly is configured to contact with the target leveling component, and the measurement rod assembly is configured to push the probe of the displacement sensor to generate measurement information;
the target component is provided with a measurement opening, the seal is arranged at the measurement opening, the measurement rod assembly passes through the seal, the measurement rod assembly and the seal are configured to move relative to each other, and the seal is configured to seal between the measurement opening and the measurement rod assembly; and
the seal comprises a connecting part, a first sealing piece, and a second sealing piece, wherein the first sealing piece and the second sealing piece are connected to the connecting part, the first sealing piece is at a preset angle with respect to the second sealing piece, and an end of the first sealing piece and an end of the second sealing piece are relatively movable, wherein the end of the first sealing piece and the end of the second sealing piece are away from the connecting part; the connecting part is connected to the target component, and the first sealing piece abuts against the measurement rod assembly.

2. The leveling apparatus according to claim 1, wherein the driving assembly is a steering engine, and the transmission assembly comprises a nut and a lead screw, wherein a power output shaft of the steering engine is connected to a first end of the nut, a second end of the nut is in threaded connection with a first end of the lead screw, and a second end of the lead screw is connected to the target component, wherein the lead screw is configured to push and/or pull back the target component in the first direction; or
the driving assembly is an electric motor, and the transmission assembly is the lead screw, wherein a power output shaft of the electric motor is in connection with the first end of the lead screw, and the second end of the lead screw is configured to be in connection with the target component.

3. The leveling apparatus according to claim 1, wherein the measurement module comprises a displacement sensor, and the displacement sensor comprises a sensor body and a probe passing through the sensor body, wherein two ends of the probe are exposed from the sensor body, a first end of the probe is configured to contact with a target leveling component, and a second end of the probe is provided with a limiting member;
the measurement module further comprises a support seat assembly, wherein the support seat assembly is connected to the target component, and the displacement sensor is connected to the support seat assembly; or:
the measurement module further comprises the support seat assembly, and the leveling module further comprises a connecting assembly, wherein the transmission assembly is connected to the target component through the connecting assembly, the support seat assembly is connected to the connecting assembly, the displacement sensor is connected to the support seat assembly, the connecting assembly is provided with a probe penetrating opening, and an end of the probe is passed through the probe penetrating opening and configured to contact with the target leveling component.

4. The leveling apparatus according to claim 1, wherein the leveling module further comprises a fixing assembly and a connecting assembly, wherein
the driving assembly is connected to the fixing assembly and the transmission assembly, the transmission assembly is connected to the connecting assembly, and the connecting assembly is configured to be connected to the target component.

5. The leveling apparatus according to claim 4, wherein the connecting assembly comprises a first positioning hole, the fixing assembly comprises a second positioning hole at a position corresponding to the first positioning hole, and a positioning assembly comprises a positioning bolt, wherein the positioning bolt is passed through the first positioning hole and the second positioning hole;

a supporting step is provided in the first positioning hole or the second positioning hole, the supporting step is configured to support an end of the positioning bolt such that at least one end of the positioning bolt is respectively positioned in the first positioning hole or the second positioning hole; and the positioning assembly further comprises a positioning sleeve, wherein the positioning sleeve is positioned between the fixing assembly and the connecting assembly, and the positioning bolt is passed through the first positioning hole, the second positioning hole and the positioning sleeve.

6. The leveling apparatus according to claim 1, wherein the transmission assembly comprises a nut and a lead screw;

the driving assembly is connected to the fixing assembly, the nut is connected to the driving assembly, a first end of the lead screw is in connection with the nut, and a second end of the lead screw is connected to a connecting assembly; and the nut is configured to rotate under an action of the driving assembly, and the lead screw is moved relatively to the fixing assembly through an action of the nut.

7. The leveling apparatus according to claim 6, wherein the transmission assembly further comprises a stop washer, the stop washer comprises a limiting opening, and the lead screw comprises a limit recess, wherein the stop washer is connected to the fixing assembly, the lead screw is passed through the limiting opening, and the limiting opening is abutted against the limit recess, wherein the limiting opening is configured to circumferentially limit the lead screw; and the stop washer further comprises a mounting hole and at least one mounting head, wherein the mounting hole is connected to the limiting opening, the at least one mounting head is located on an outer periphery of the stop washer, and the at least one mounting head is configured to limit a rotation of the lead screw.

8. The leveling apparatus according to claim 6, wherein the transmission assembly further comprises a first elastic component, wherein the first elastic component is configured to directly or indirectly apply an elastic force or a contraction force to the lead screw;

the fixing assembly comprises a limiting sleeve;

the transmission assembly comprises a stop washer, and the stop washer comprises a limiting opening, wherein the lead screw is provided with a limit recess, the stop washer is connected to the limiting sleeve, the lead screw is passed through the limiting opening, a first end of the first elastic component is abutted against the connecting assembly, a second end of the first elastic component is abutted against the stop washer, and the lead screw is movably passed through the connecting assembly.

9. A 3D printer, comprising the leveling apparatus of claim 1.

10. The 3D printer according to claim 9, wherein the driving assembly is a steering engine, and the transmission assembly comprises a nut and a lead screw, wherein a power output shaft of the steering engine is connected to a first end of the nut, a second end of the nut is in threaded connection with a first end of the lead screw, and a second end of the lead screw is connected to the target component, wherein the lead screw is configured to push and/or pull back the target component in the first direction; or the driving assembly is an electric motor, and the transmission assembly is the lead screw, wherein a power output shaft of the electric motor is in connection with the first end of the lead screw, and the second end of the lead screw is configured to be in connection with the target component.

11. The 3D printer according to claim 9, wherein the measurement module comprises a displacement sensor, and the displacement sensor comprises a sensor body and a probe passing through the sensor body, wherein two ends of the probe are exposed from the sensor body, a first end of the probe is configured to contact with a target leveling component, and a second end of the probe is provided with a limiting member;

the measurement module further comprises a support seat assembly, wherein the support seat assembly is connected to the target component, and the displacement sensor is connected to the support seat assembly; or:

the measurement module further comprises the support seat assembly, and the leveling module further comprises a connecting assembly, wherein the transmission assembly is connected to the target component through the connecting assembly, the support seat assembly is connected to the connecting assembly, the displacement sensor is connected to the support seat assembly, the connecting assembly is provided with a probe penetrating opening, and an end of the probe is passed through the probe penetrating opening and configured to contact with the target leveling component.

12. The 3D printer according to claim 9, wherein the leveling module further comprises a fixing assembly and a connecting assembly, wherein the driving assembly is connected to the fixing assembly and the transmission assembly, the transmission assembly is connected to the connecting assembly, and the connecting assembly is configured to be connected to the target component.

13. The 3D printer according to claim 12, wherein the connecting assembly comprises a first positioning hole, the fixing assembly comprises a second positioning hole at a position corresponding to the first positioning hole, and a positioning assembly comprises a positioning bolt, wherein the positioning bolt is passed through the first positioning hole and the second positioning hole;

a supporting step is provided in the first positioning hole or the second positioning hole, the supporting step is configured to support an end of the positioning bolt such that at least one end of the positioning bolt is respectively positioned in the first positioning hole or the second positioning hole; and the positioning assembly further comprises a positioning sleeve, wherein the positioning sleeve is positioned between the fixing assembly and the connecting assembly, and the positioning bolt is passed through the first positioning hole, the second positioning hole and the positioning sleeve.

14. The 3D printer according to claim 7, wherein the transmission assembly comprises a nut and a lead screw;

the driving assembly is connected to the fixing assembly, the nut is connected to the driving assembly, a first end of the lead screw is in connection with the nut, and a second end of the lead screw is connected to a connecting assembly; and the nut is configured to rotate under an action of the driving assembly, and the lead screw is moved relatively to the fixing assembly through an action of the nut.

15. The 3D printer according to claim 14, wherein the transmission assembly further comprises a stop washer, the stop washer comprises a limiting opening, and the lead screw comprises a limit recess, wherein the stop washer is connected to the fixing assembly, the lead screw is passed through the limiting opening, and the limiting opening is abutted against the limit recess, wherein the limiting opening is configured to circumferentially limit the lead screw; and the stop washer further comprises a mounting hole and at least one mounting head, wherein the mounting hole is connected to the limiting opening, the at least one mounting head is located on an outer periphery of the stop washer, and the at least one mounting head is configured to limit a rotation of the lead screw.

16. The 3D printer according to claim 14, wherein the transmission assembly further comprises a first elastic component, wherein the first elastic component is configured to directly or indirectly apply an elastic force or a contraction force to the lead screw;

the fixing assembly comprises a limiting sleeve;

the transmission assembly comprises a stop washer, and the stop washer comprises a limiting opening, wherein the lead screw is provided with a limit recess, the stop washer is connected to the limiting sleeve, the lead screw is passed through the limiting opening, a first end of the first elastic component is abutted against the connecting assembly, a second end of the first elastic component is abutted against the stop washer, and the lead screw is movably passed through the connecting assembly.

*    *    *    *    *